US009227644B1

(12) United States Patent
Piscitello et al.

(10) Patent No.: US 9,227,644 B1
(45) Date of Patent: Jan. 5, 2016

(54) WHEELED CART

(71) Applicant: The Real Wheel, LLC, Lexington, MA (US)

(72) Inventors: Jacqueline L. Piscitello, Lexington, MA (US); Yavor Gegov, Glasgow (GB)

(73) Assignee: The Real Wheel, LLC, Lexington, MA (US)

(*) Notice: Subject to any disclaimer, the term of this patent is extended or adjusted under 35 U.S.C. 154(b) by 101 days.

(21) Appl. No.: 14/019,955

(22) Filed: Sep. 6, 2013

(51) Int. Cl.
*B63H 16/04* (2006.01)
*B62B 1/20* (2006.01)
*B63H 16/06* (2006.01)

(52) U.S. Cl.
CPC ............ *B62B 1/20* (2013.01); *B63H 16/04* (2013.01); *B63H 16/06* (2013.01)

(58) Field of Classification Search
CPC .................................... B62B 1/20; B62B 1/12
See application file for complete search history.

(56) References Cited

U.S. PATENT DOCUMENTS

| | | | | | |
|---|---|---|---|---|---|
| 2,546,604 | A | * | 3/1951 | Lafky | 296/20 |
| 2,629,608 | A | * | 2/1953 | Jones | 280/653 |
| 3,451,460 | A | * | 6/1969 | Sipin | 152/417 |
| 4,160,495 | A | * | 7/1979 | Conard | 190/18 A |
| 4,436,039 | A | * | 3/1984 | Stephens, Jr. | 111/100 |
| 6,139,033 | A | * | 10/2000 | Western | 280/47.23 |

* cited by examiner

*Primary Examiner* — Edwin Swinehart
(74) *Attorney, Agent, or Firm* — Patent GC, LLC

(57) ABSTRACT

A rolling cart comprises a frame unit defining an interior space in which items are transportable; a wheel, the wheel having a boundary defined by a circumference, a left edge maximum extent, and a right edge maximum extent; and the interior space at least partly within the boundary. The rolling cart may further comprise a container in which the items are transportable suspended within the interior space. The container can be integral to the frame unit. In another variation, the rolling cart further comprises: a plurality of left rollers rotatably connected to the frame unit; a plurality of right rollers rotatably connected to the frame unit; a left inner surface defined by the wheel, the left inner surface contacting the left rollers for rotatable support; and a right inner surface defined by the wheel, the right inner surface contacting the right rollers for rotatable support. The wheel may include inflatable segments and a distributions system for an inflation fluid including a bi-directional pump and valves.

13 Claims, 35 Drawing Sheets

WHEELED CART

BACKGROUND

The present invention relates generally to wheeled carts. More particularly, the invention relates to carts for transporting goods, material, and people over a wide range of terrain types, including rough, rocky, sandy, muddy, rutted, paved, water-covered terrain and surfaces, uneven terrain and surfaces, and stairs.

SUMMARY

The invention is realized in embodiments that include a pneumatic, segmented pneumatic, mechanically articulated, or other conformable wheel. The wheel has a large inner diameter so as to accommodate a storage container within a frame from which the wheel is rotatably suspended. The width of the ground-contact region of the wheel can be as wide as the container, so as to maintain the center of gravity between the edges of the ground-contact region of the wheel. The contact region of the wheel can be somewhat narrower, provided the center of gravity is still controlled to remain between the edges of the ground-contact region, so as to maintain stability. Handles attach to the frame or the container on each side of the wheel. A sheet of canvas or the like can be suspended between the handles to form a medical stretcher or litter for transporting equipment or an injured or exhausted member of a party performing work, sport, or the like, in the field. The handles can be detachable, and with attachments can serve other purposes, such as forming oars for use with a buoyant embodiment of the wheel, which when floating on a water surface can be used as a rowboat.

According to aspects of embodiments of the invention, a rolling cart comprises: a frame unit defining an interior space in which items are transportable; a wheel, the wheel having a boundary defined by a circumference, a left edge maximum extent, and a right edge maximum extent; a handle removably supported from the frame, the cart moved and controlled by the handle; and the interior space at least partly within the boundary. A cart with only one wheel, or a cart with plural wheels is possible.

Several variations are now mentioned. According to some variations, the rolling cart can further comprise: a container in which the items are transportable suspended within the interior space. According to further variations, the container is integral to the frame unit. The rolling cart may further comprise: a plurality of left rollers rotatably connected to the frame unit; a plurality of right rollers rotatably connected to the frame unit; a left inner surface defined by the wheel, the left inner surface contacting the left rollers for rotatable support; and a right inner surface defined by the wheel, the right inner surface contacting the right rollers for rotatable support. The rolling cart may further comprise at least a second wheel. The rolling cart may also further comprise: a pole mount which can support the handle from the frame unit in a position substantially perpendicular to a plane in which the circumference lies; and a shade fabric extensible from the handle; whereby the handle, when supported by the pole mount, can support the shade fabric above a ground surface, and the shade fabric provides a sheltered area beneath the wheel when extended. The rolling cart may further comprise: an oarlock mount which can support the handle from the frame unit when the wheel lies in a position such that a plane in which the circumference lies is roughly parallel to a plane in which a water surface lies; and a paddle end fitted to a distal end of the handle when the handle is supported by the oarlock mount; wherein the cart possesses sufficient buoyancy to float along with the transportable items and a passenger. The wheel, in the cart of this variation may, in a yet further variation substantially provide the sufficient buoyancy. The rolling cart may further comprise a handle extension forward of the cart and a handle extension aft of the cart, whereby the cart can be maneuvered by two handlers, one fore and one aft. The handle may further comprise a shoulder harness, whereby the cart can be hauled using shoulder contact to transfer force from a handler to the cart. The rolling cart may further comprise a flexible sheet suspended from the handle and configured and arranged to carry a non-ambulatory person or object.

According to other variations, the wheel further comprises an inflatable segment arranged within the circumference to support the cart. According to yet a further variation of the rolling cart, usable in conjunction with a pump, the wheel further comprises: plural inflatable segments arranged within the circumference to support the cart; an inflation fluid manifold constructed and arranged to communicate with the pump for communicating inflation fluid with the inflation fluid manifold; plural bi-directional valves corresponding to the plural inflatable segments communicating inflation fluid between the inflation fluid manifold and the plural inflatable segments; the plural bi-directional valves constructed and arranged to substantially freely admit the inflation fluid from the manifold into an inflatable segment at a manifold pressure higher than a segment pressure, and to exhaust inflation fluid from the inflatable segment into the manifold only at a segment pressure higher than a manifold pressure by at least an increment provided by a combination of a load of the cart and action of the bi-directional pump communicating inflation fluid out of the inflation fluid manifold. According to even yet a further variation of the cart the plural bi-directional valves are reed valves further comprising: a valve body having a passage defined through the valve body between the inflation fluid manifold and the inflatable segment, the passage having an edge; a reed affixed to the edge of the passage, having one surface toward the inflation fluid manifold and another surface toward the inflatable segment, and bendable toward the inflation fluid manifold or the inflatable segment through the passage; and a spring disposed substantially adjacent to one surface of the reed such that a higher pressure is required to bend the reed toward the inflation fluid manifold than toward the inflatable segment. According to another further variation of the rolling cart, usable in conjunction with a pump, the wheel further comprises: plural inflatable segments arranged within the circumference to support the cart; an inflation fluid manifold constructed and arranged to communicate with the pump for communicating inflation fluid with the inflation fluid manifold; plural bi-directional valves corresponding to the plural inflatable segments manually selectable to communicate inflation fluid between the inflation fluid manifold and each one or more of the plural inflatable segments.

In the following description, reference is made to the accompanying drawings, which form a part hereof, and in which are shown example implementations. It should understood that other implementations are possible, and that these example implementations are intended to be merely illustrative.

DETAILED DESCRIPTION

The following section provides a general and detailed description of some embodiments and alternatives of the invention. Reference is made to the FIGS., which illustrate various aspects of embodiments of the invention.

Figure 1:
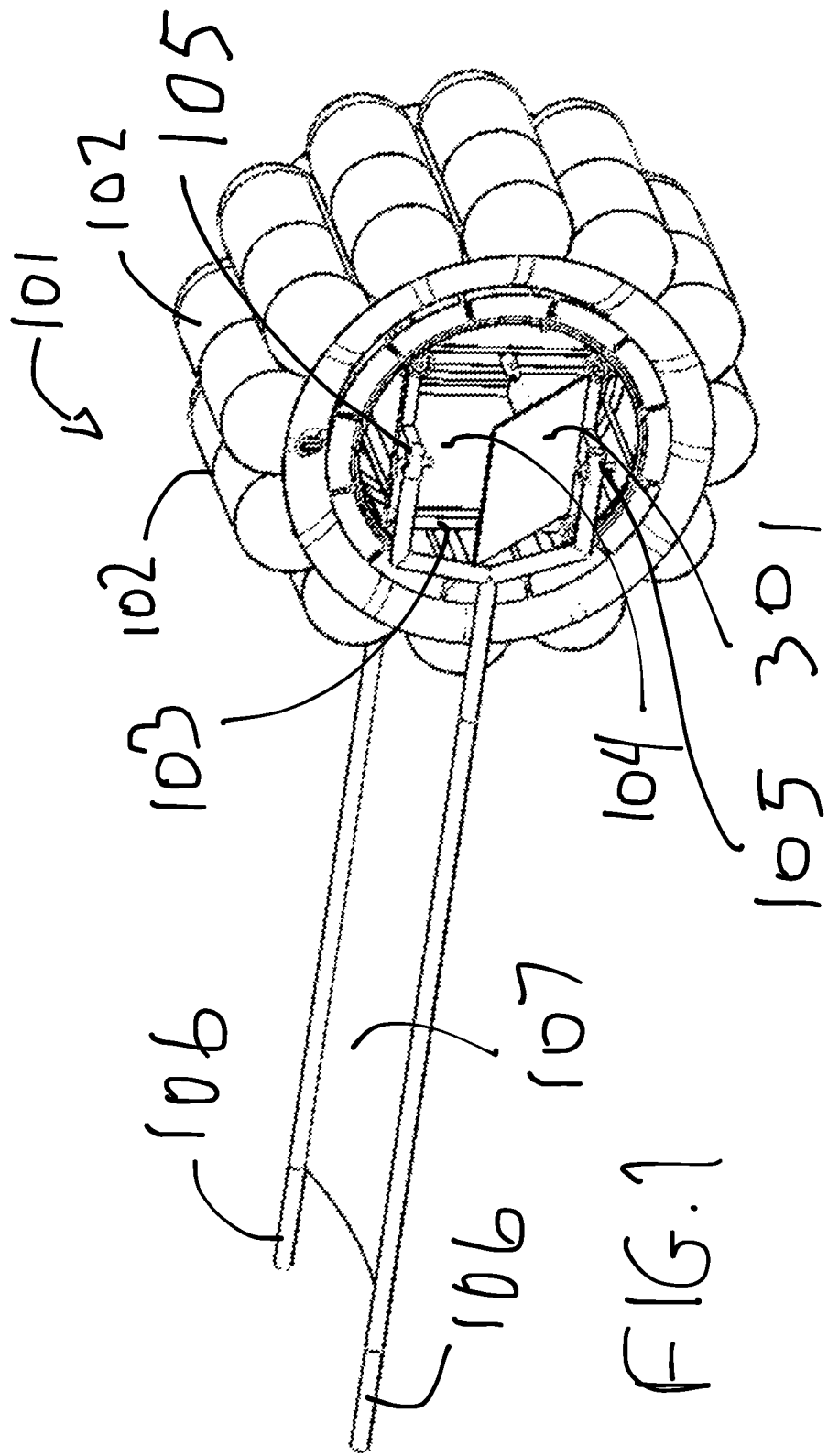
FIG. 1 is an isometric view of an embodiment of the invention.
Figure 35:
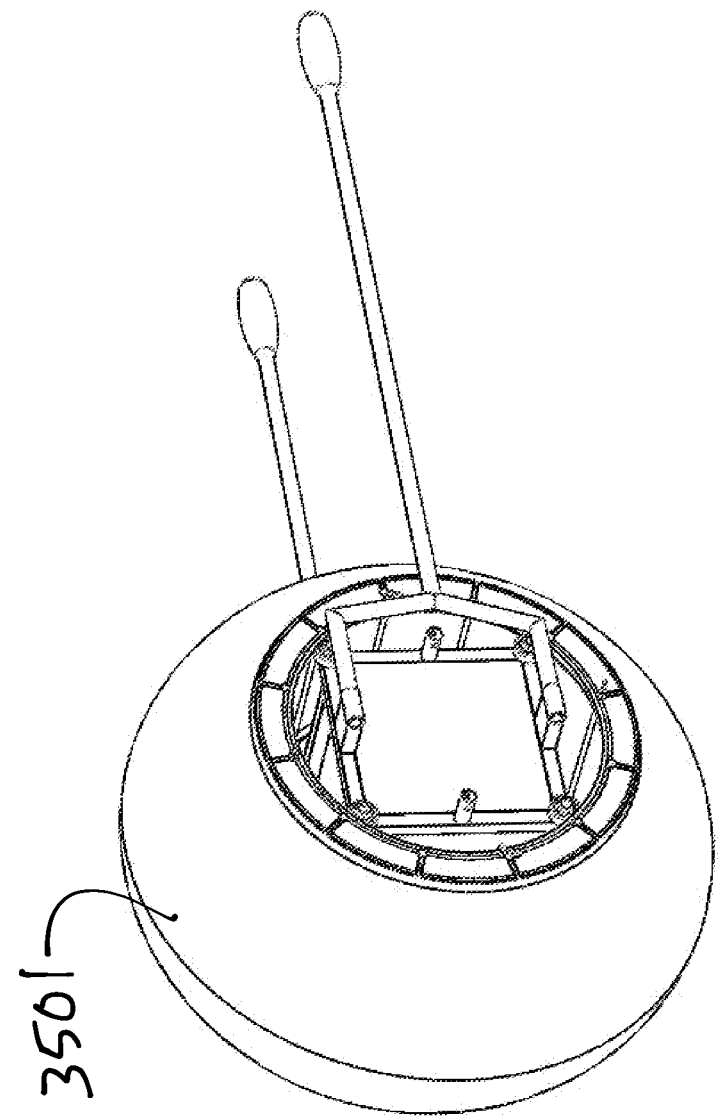
FIG. 35 is an isometric view of a cart having a single chamber, or a covering over plural chambers, so as to present a more uniform surface.

Referring to FIG. 1, a first embodiment is now described to illustrate examples of some elements and aspects of the invention. This embodiment includes a wheel, 101, having plural, inflatable tread elements, 102. The tread elements, 102, may be independent chambers, each inflated separately with an inflation fluid such as air, nitrogen, water or any other suitable fluid, or may collectively form one or more larger chambers due to communication of the inflation fluid between them via tubes or holes in a common wall. In two additional variations, shown in FIG. 35, a wheel, 3501, can have a single chamber, or a covering over plural chambers, so as to present a more uniform surface. The wheel, 101, is rotationally connected to a frame, 103. The interior of the frame, 103, houses a container, 104, within which articles the user desires to carry can be secured. The container, 104, may have a latching or locking door, 301, for example, to secure the articles carried within the container, 104. The frame further includes mounting brackets, 105, lateral to the wheel, 101, which receive laterally disposed handles, 106, by which the cart can be pushed or pulled over or through the terrain in which the user is using the cart. The handles, 106, may be further connected and stabilized by the addition of bracing (not shown), and a canvas sheet, 107, or the like may connect the handles, 106, to form a medical stretcher or litter for carrying an injured or tired person, or for carrying equipment, through the field. Alternative embodiments have the handles, 106, attached directly to the frame, 103, rather than through mounting brackets, 105. Any suitable connector, preferably removable and replaceable in the field, can be used to attach the handles to the mounting brackets or frame, such as a socket, a socket with a detent, a socket with a cotter pin retainer, a bolt, threads on the end of the handles, 106, and the like.

Figure 2:
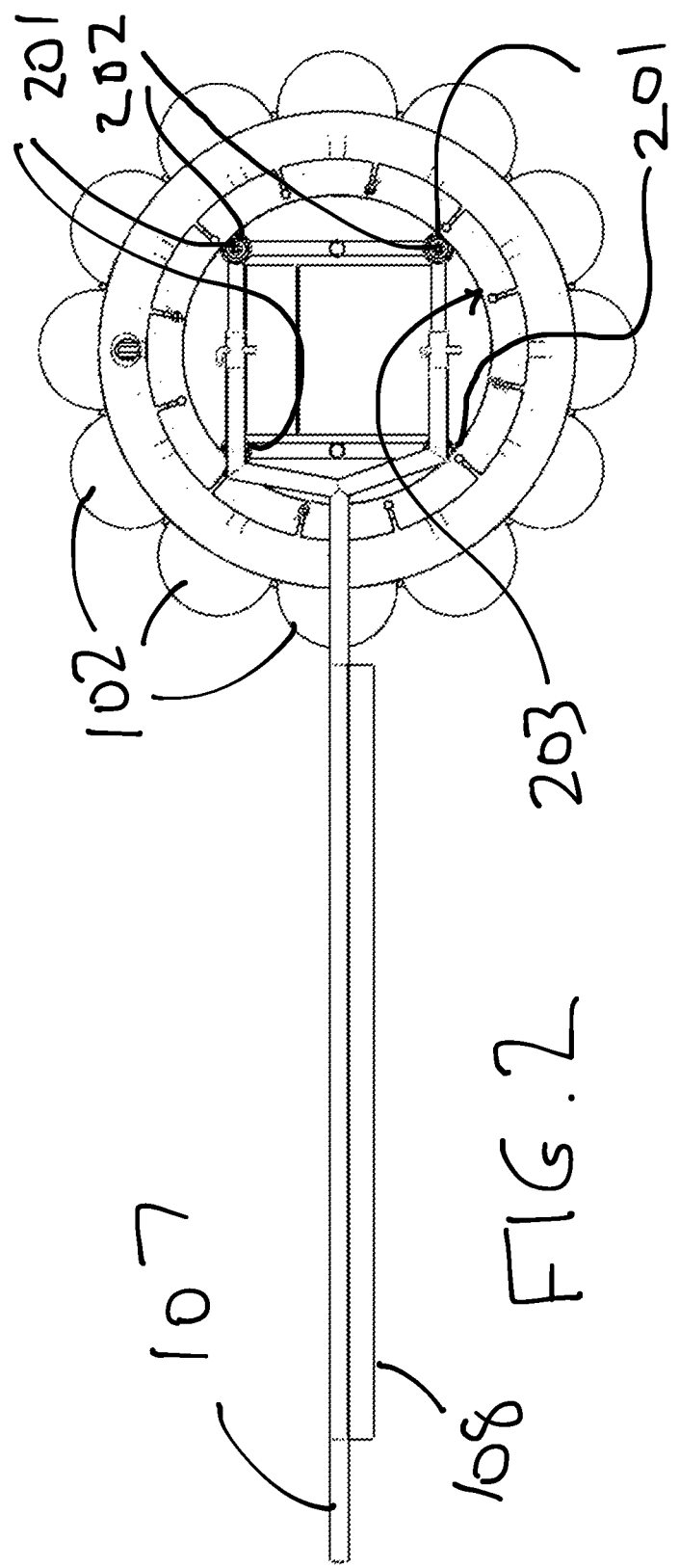
FIG. 2 is a side view of the embodiment of FIG. 1.

In the side view of FIG. 2, some additional details of the embodiments described in connection with FIG. 1 are seen. Rotational connection of the wheel, 101, to the frame, 103, can be seen to be achieved by small wheels, 201, each rotationally affixed to the frame, 103, at discrete points where small axels, 202, are connected to the frame, 103. The small wheels, 201, are located towards both lateral sides of the wheel, 101, where they ride in tracks, 203, affixed to the wheel, 101. Thus, the forces due to the mass of the frame, 103, container, 104, and any contents of the container, 104, pushing or pulling of the handles, 106, etc. are transmitted to the wheel, 101, through the axels, 202, the small wheels, 201, and the tracks, 203, to cause the wheel, 101, to support the same and permit movement over the terrain.

Figure 3:
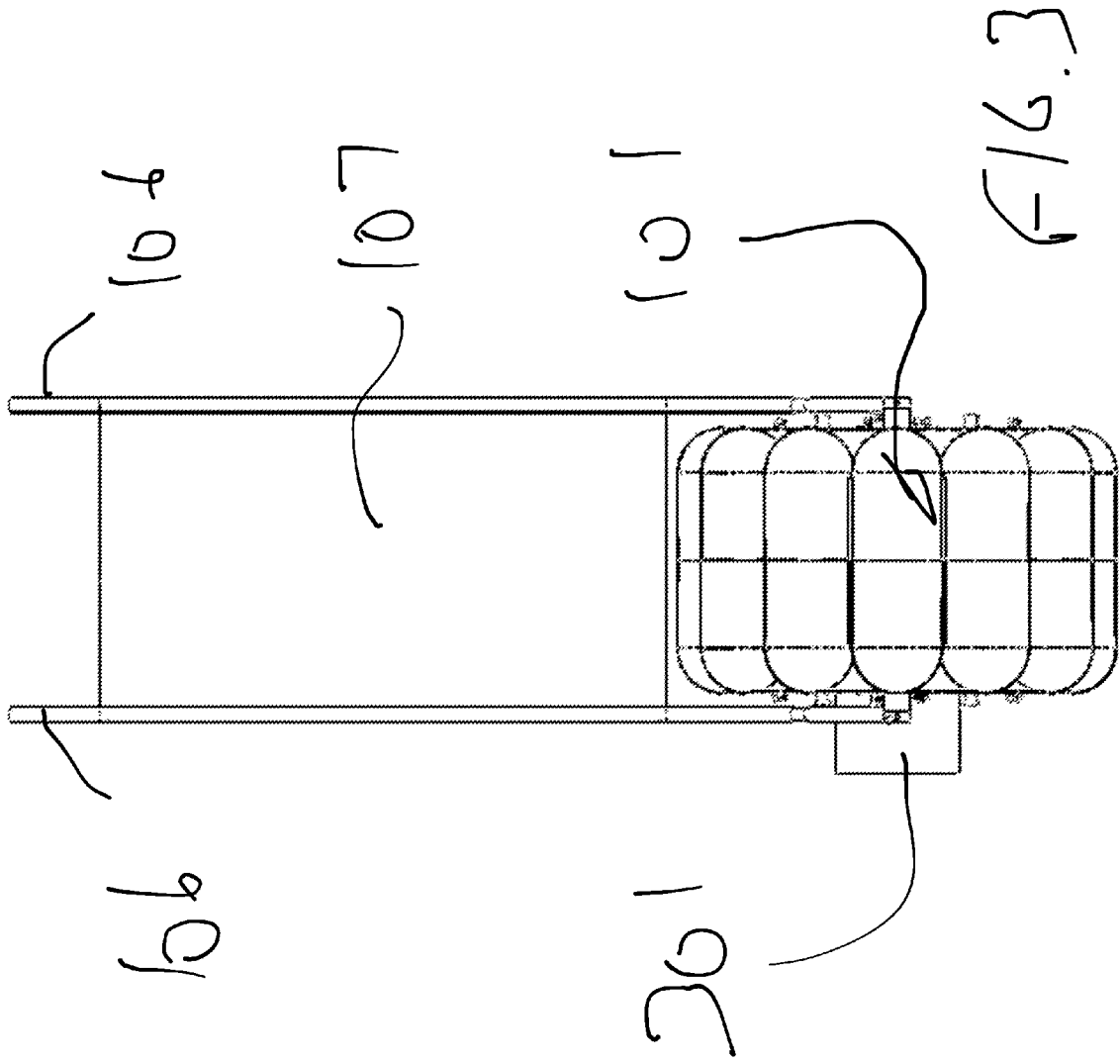
FIG. 3 is a top view of the embodiment of FIG. 1.

FIG. 3 additionally shows a door, 301, to container, 104, in a partially open position.

Figure 4:
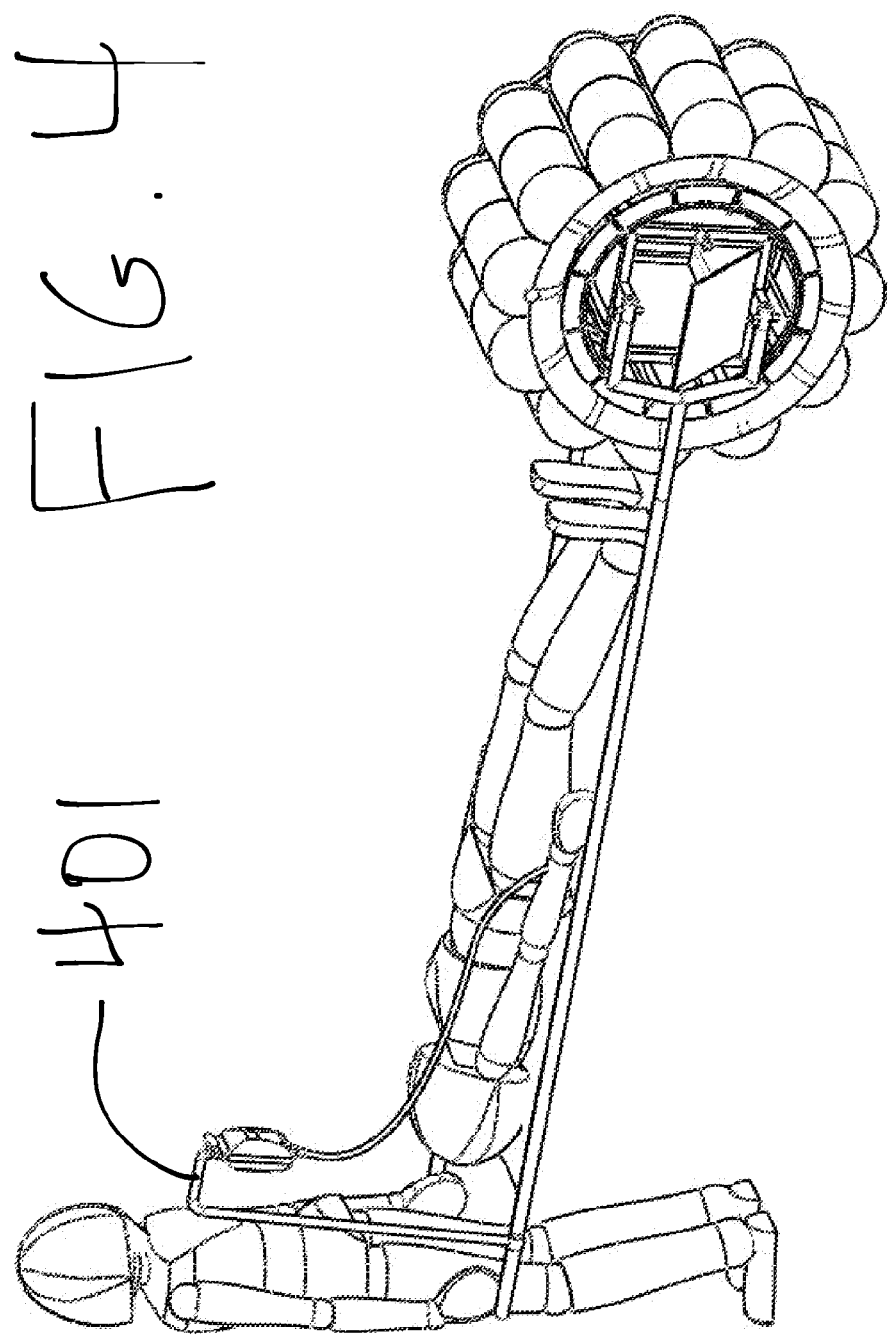
FIG. 4 is a perspective view of the embodiment of FIG. 1 in use as a medical stretcher in the field.

FIG. 4 shows the configuration just described, in use as a medical litter. Supplies can be carried in the container, 104, and deployed such as the IV pole, 401, as needed. The IV pole or the like, 401, clamps onto a handle at any convenient location.

Figure 5:
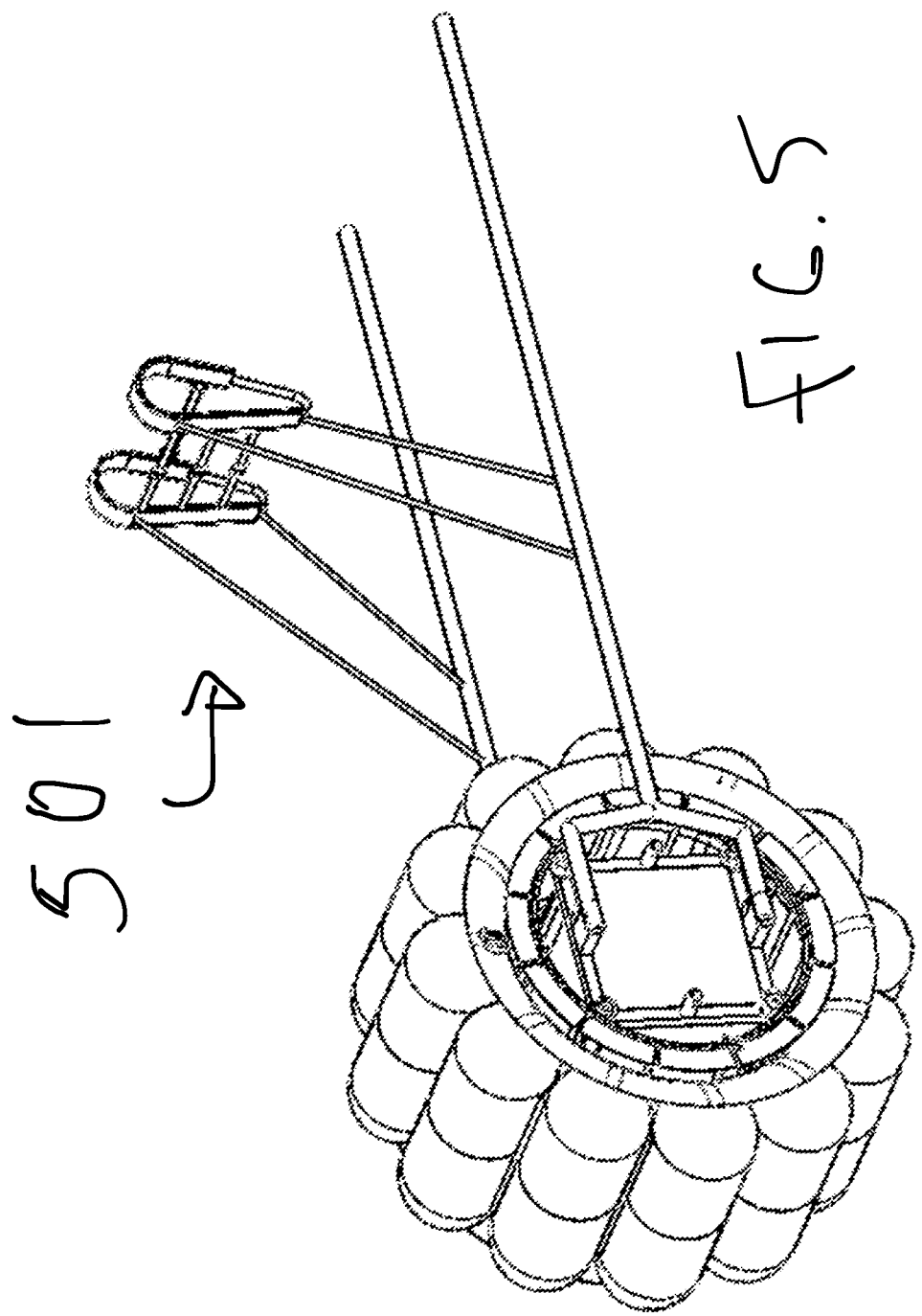
FIG. 5 is an isometric view of an alternate embodiment of the invention.
Figure 6:
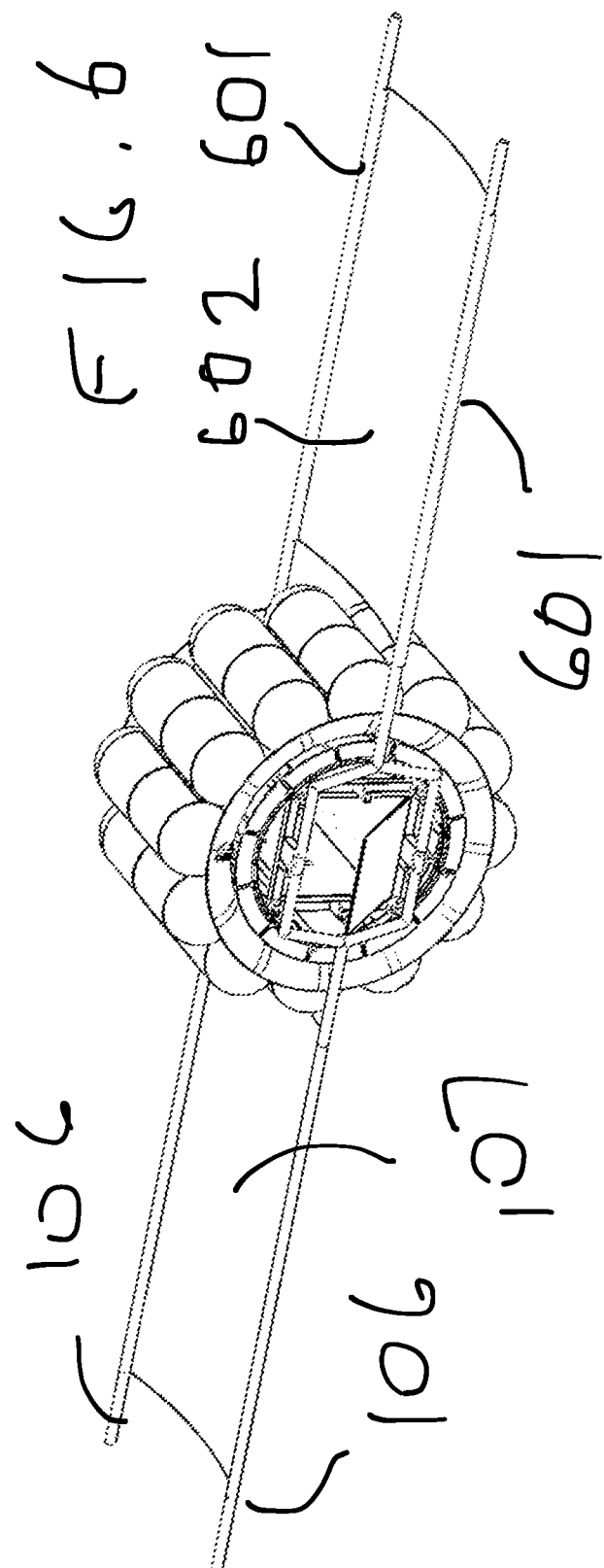
FIG. 6 is an isometric view of another alternate embodiment of the invention.

FIGS. 5 and 6 illustrate some variations of the above-described embodiments that enable the invention to carry greater loads over rougher terrain or up hills or stairs. In FIG. 5, straps are added to form a harness, 501, for an operator to distribute the lifting or hauling load to the operator's shoulders, similar to the way a backpack is worn. The harness may be rigidly attached to the handles, 106, or may be formed entirely of webbing, flexible line, or the like, or may be a combination of fixed and flexible materials. In FIG. 6, a second set of handles, 601, is added, along with a canvas, 602, to form a second medical litter. Thus, in the variation shown in FIG. 6, two operators can move a load nearly twice as large or over far more challenging terrain as a single operator can. The capacity of this embodiment or challenge of the terrain over which it is used can be further increased by combining the two handles of FIG. 6 with the harness of FIG. 5.

Figure 7:
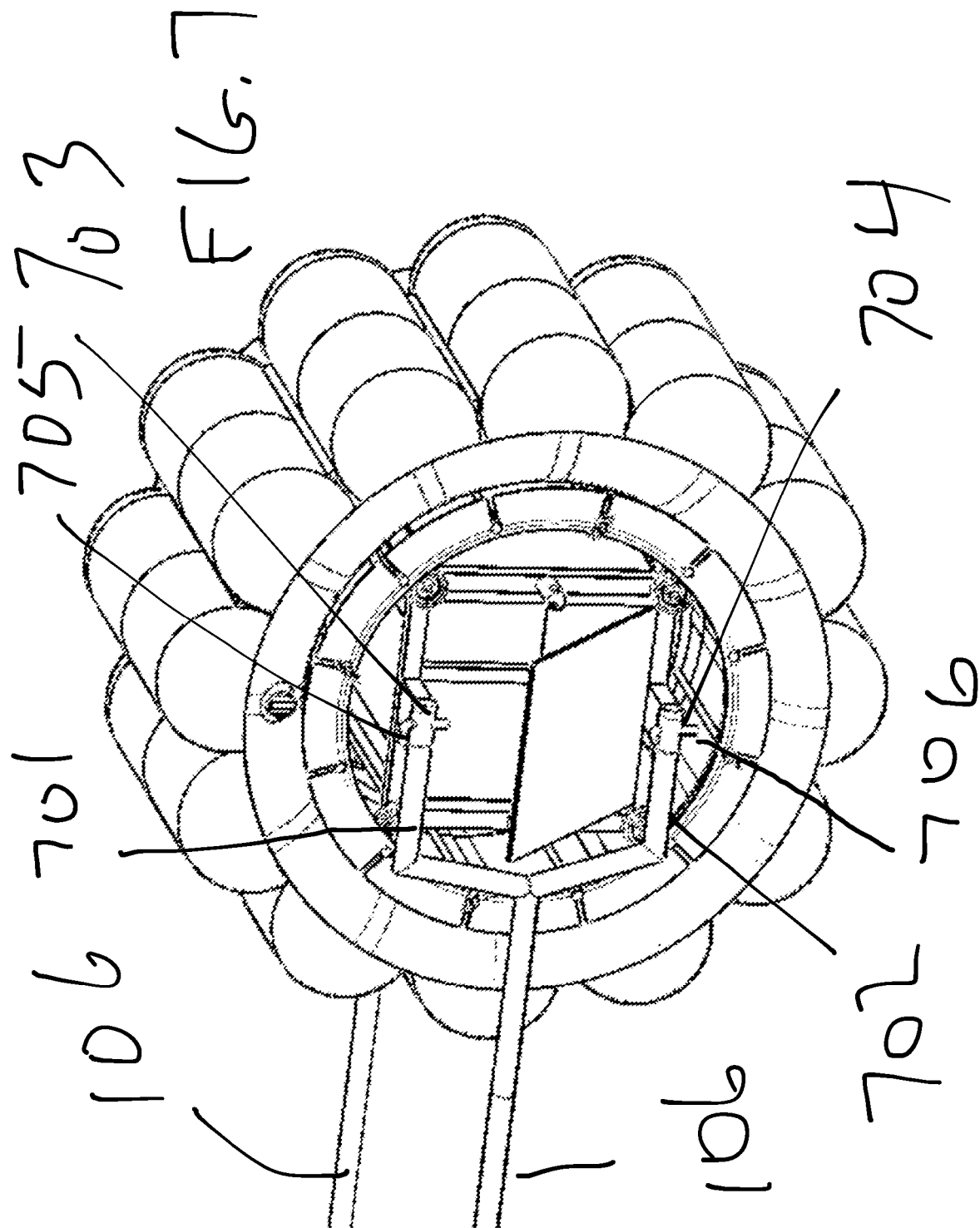
FIG. 7 is a detail showing the wheel, container, and handle construction of embodiments of FIGS. 1-5.

FIG. 7 shows the details of the handle attachment to the frame. Each handle, 106, has a bifurcated end, 701 and 702, which insert into two sockets, 703 and 704. The bifurcated ends, 701 and 702, are held in the sockets, 703 and 704, by clevis pins, 705 and 706, that drop in from above. With that arrangement, clevis pins, 705 and 706, may require no further securing, as they may be held in place by gravity; however, they may be arranged to enter from a different angle, or may require securing due to the intended use of the cart. In such an instance, clevis pins, 705 and 706, may include a ball detent, a cotter pin hole, or other retention device as may be desired.

Figure 8:
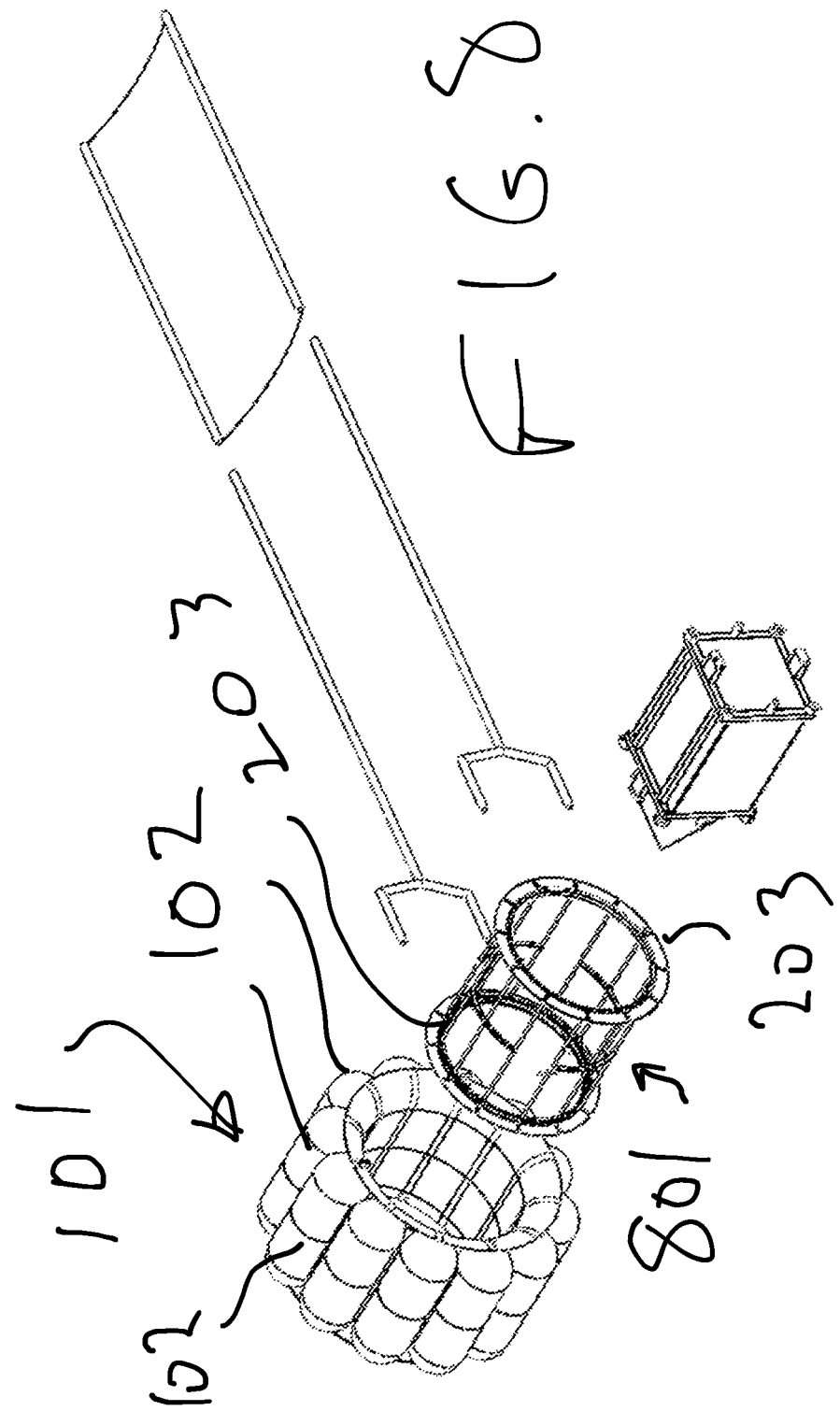
FIG. 8 is an exploded view of the embodiments of FIGS. 1-5.
Figure 9:
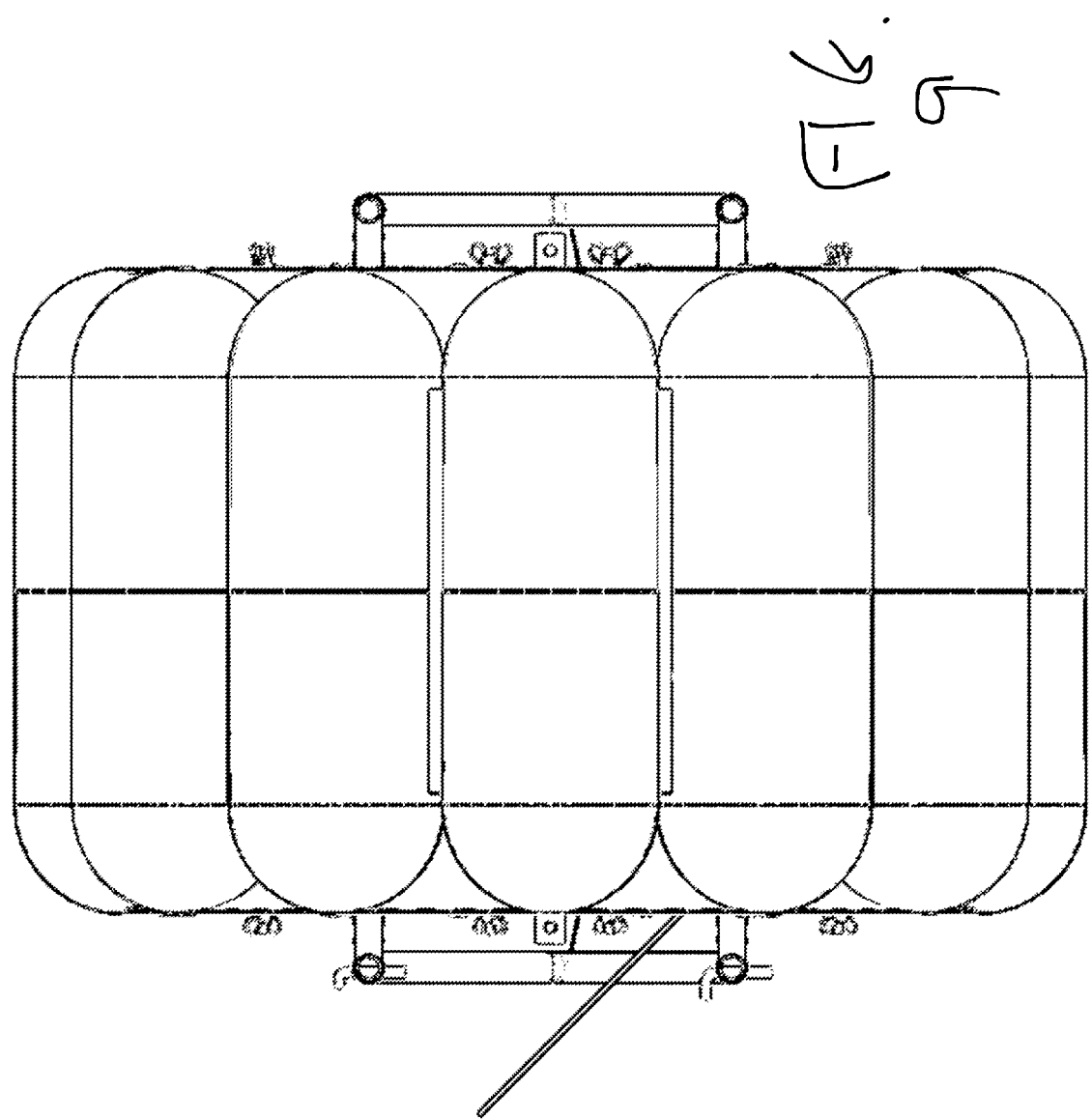
FIG. 9 is a front view of the wheel of the embodiments of FIGS. 1-8.

FIGS. 8 and 9 show how the components go together. Wheel, 101, comprises the separate tread elements, 102, bonded, formed, or otherwise joined into a single wheel, 101. Cage, 801, holds tracks, 203, within and at the edges of wheel, 101, where small wheels, 201, rotationally support frame, 103, to wheel, 101. In an alternative embodiment, frame, 103, can have circular tracks (not shown) disposed in opposition to tracks, 203. In such an embodiment, small wheels, 201, need not be affixed to axles, 202, but rather a large plurality of such small wheels, 201, can be captured between the opposed tracks by raised walls at the edges of the tracks, to form two large roller bearings supporting the frame, 103, from the interior of the wheel, 101.

Figure 10:
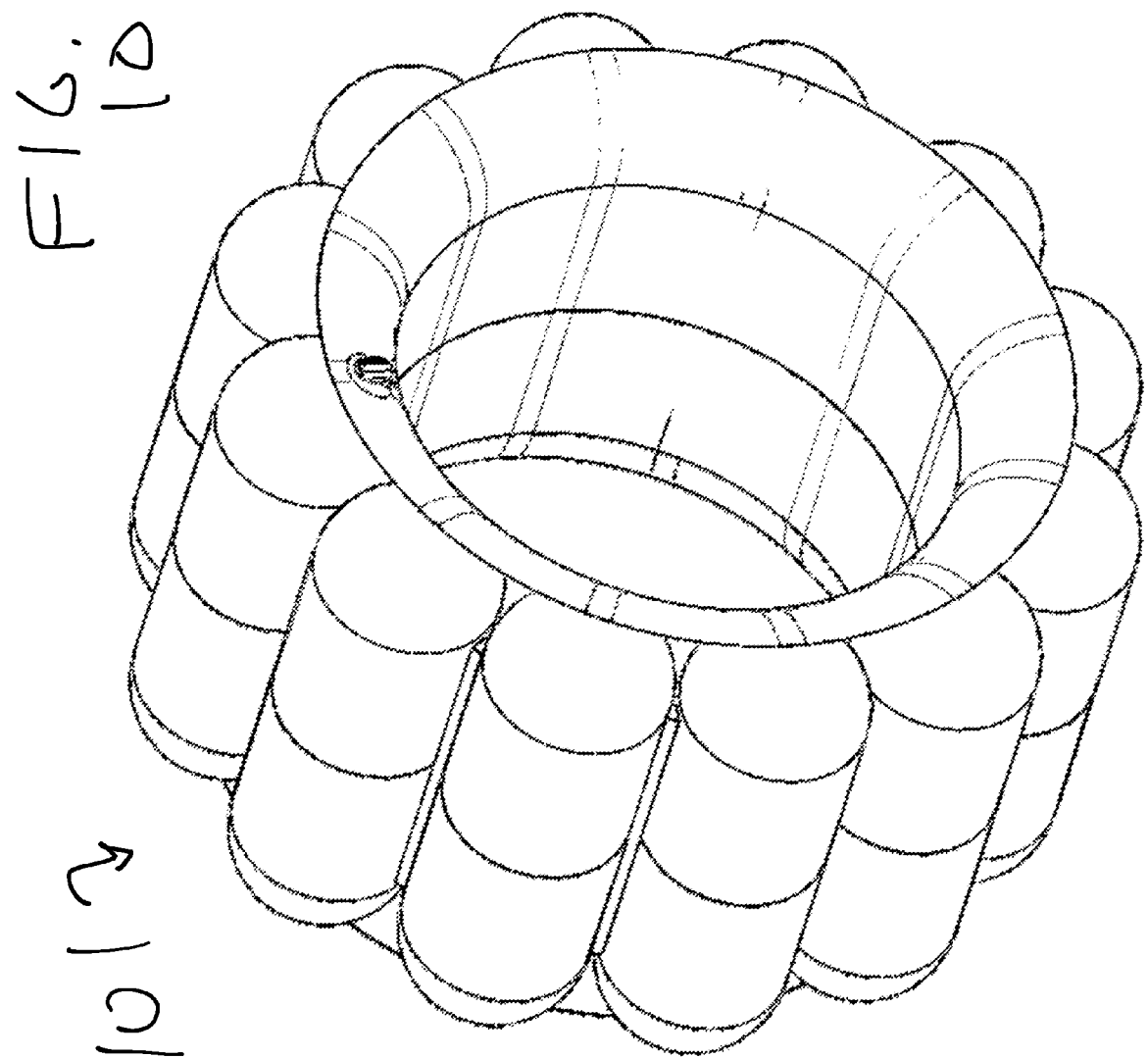
FIG. 10 is an isometric view of the wheel of FIG. 9.

FIG. 10 shows the segmented wheel, 101, of the exemplary embodiment. The wheel could alternatively be constructed to have a single inflatable chamber, or plural joined chambers inflatable from a single point. The wheel could alternatively have a flat tread region, rather than the segmented tread region shown, whether single or multiple chambers are used. The wheel could also be formed of a conformable material, such as an elastomer, gel-filled envelope of similar shape to that shown, or a foam, or the wheel could be of a hard material, such as a plastic or hard rubber. The selection of wheel material can depend on the use to which the cart will be put.

Figure 11:
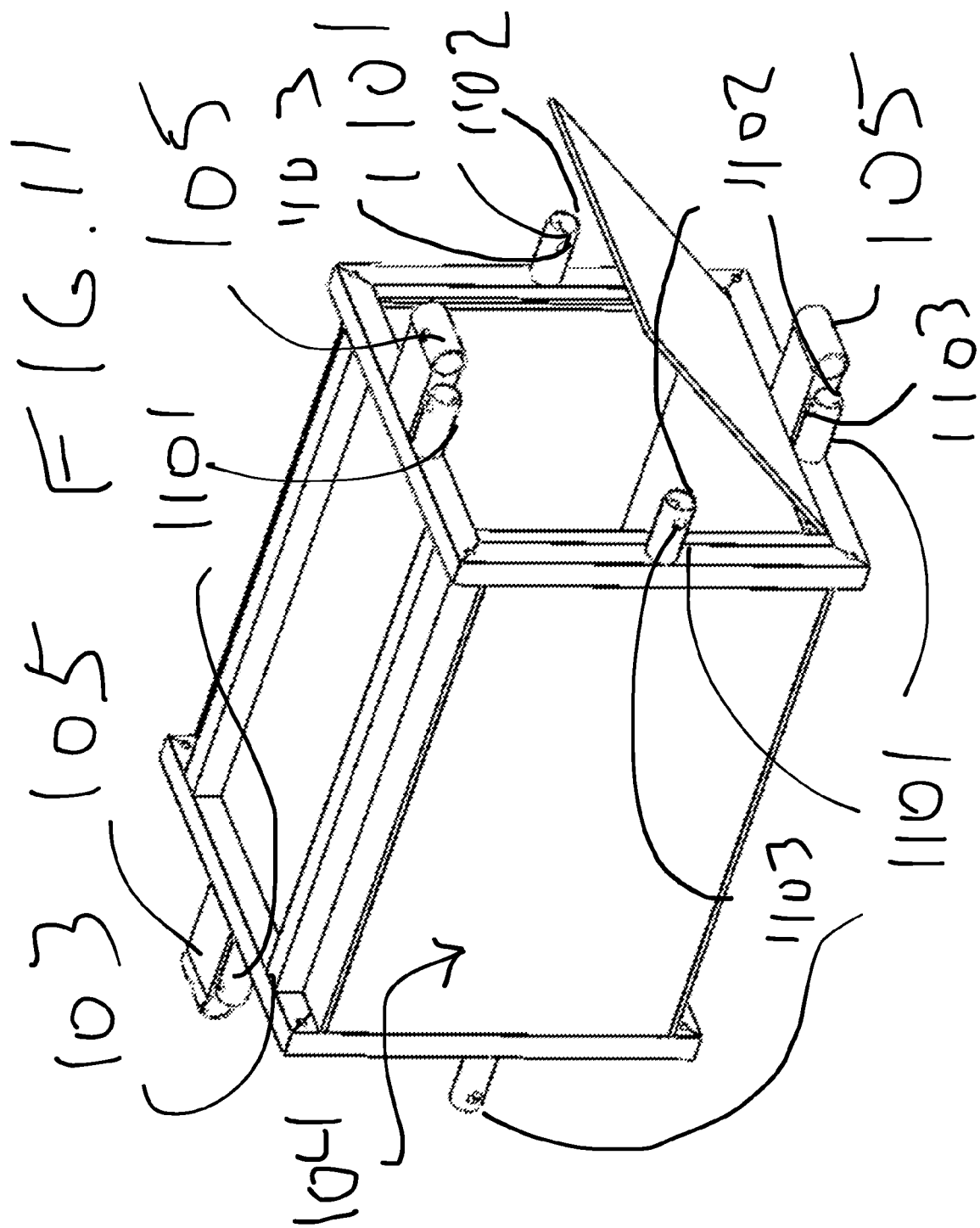
FIG. 11 is an isometric view of the container of embodiments of the invention.

FIG. 11 shows the frame, 103, and container, 104, along with the mounting brackets, 105. Mounting brackets, 105, are arranged with sockets aligned parallel with a radial direction from the wheel. Mounting brackets, 105, are those illustrated in connection with the embodiments described above. Additional mounts, 1101, are aligned parallel with an axial direction from the wheel. Each mounting bracket, 105, and mount, 1101, has defined therein a socket, 1102, into which can be received a handle (not shown), and a hole, 1103, into which can be received a clevis pin (not shown). Alternative embodiments, such as handles with threaded ends can also be used to attach handles to mounting brackets, 105, or to mounts, 1101. See, also, FIG. 14, which shows attaching oarlocks to two mounts, 1101; attaching oar heads to two handles; and using the handles (now oars) in connection with the oarlocks to turn the cart into a small rescue or transport boat, or the like.

In the embodiment illustrated in FIG. 11, the frame, 103, and container, 104, are integrated into a single component, providing additional strength to the unit; however, in an alternative embodiment, the frame, 103, can include rails on which container, 104, can be slid in and out. Any suitable locking mechanism can retain the container, 104, in place within the frame, 103, in such an embodiment.

Figure 12:
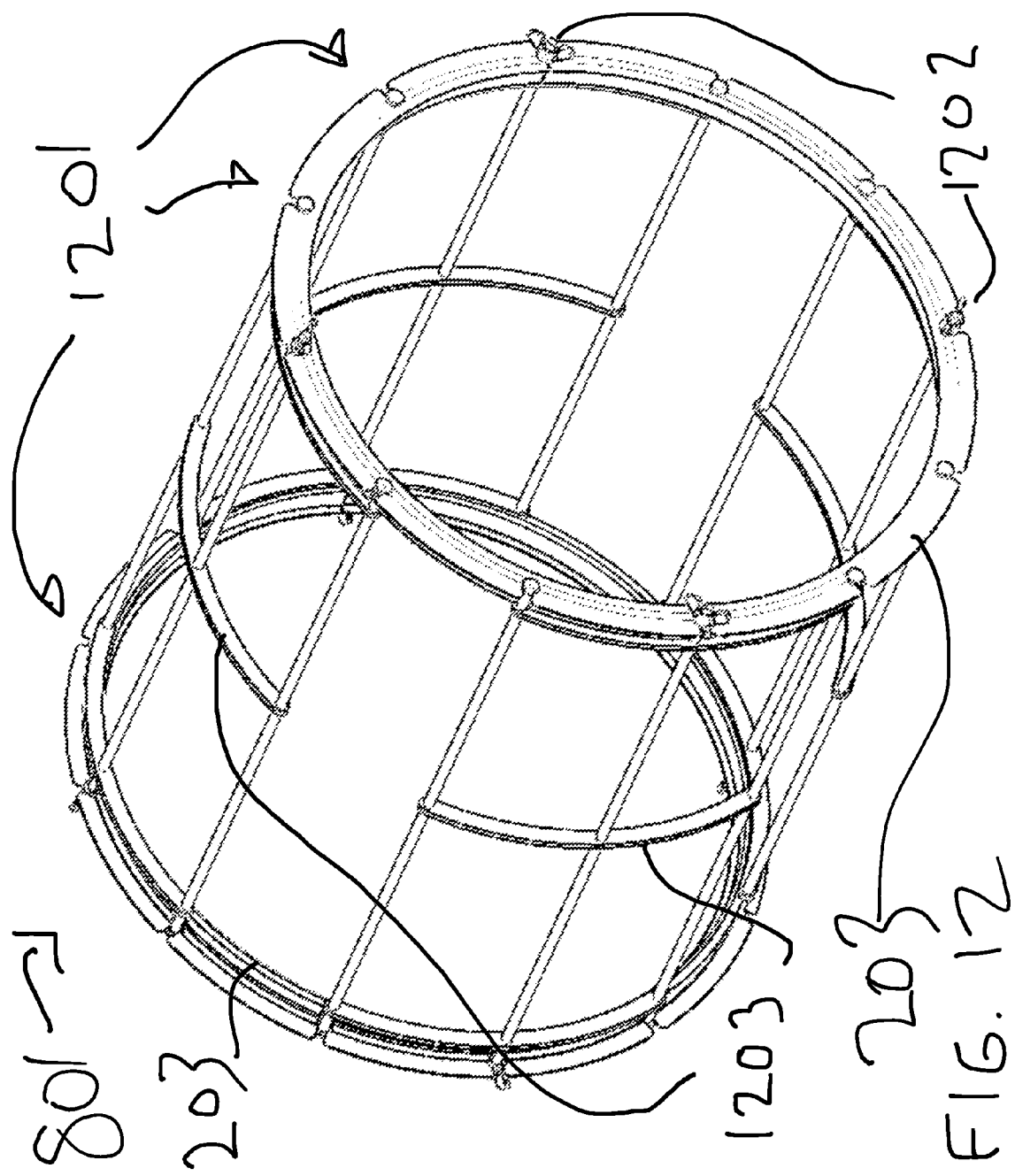
FIG. 12 is an isometric view of a cage that supports the wheel of various embodiments of the invention.
Figure 13:
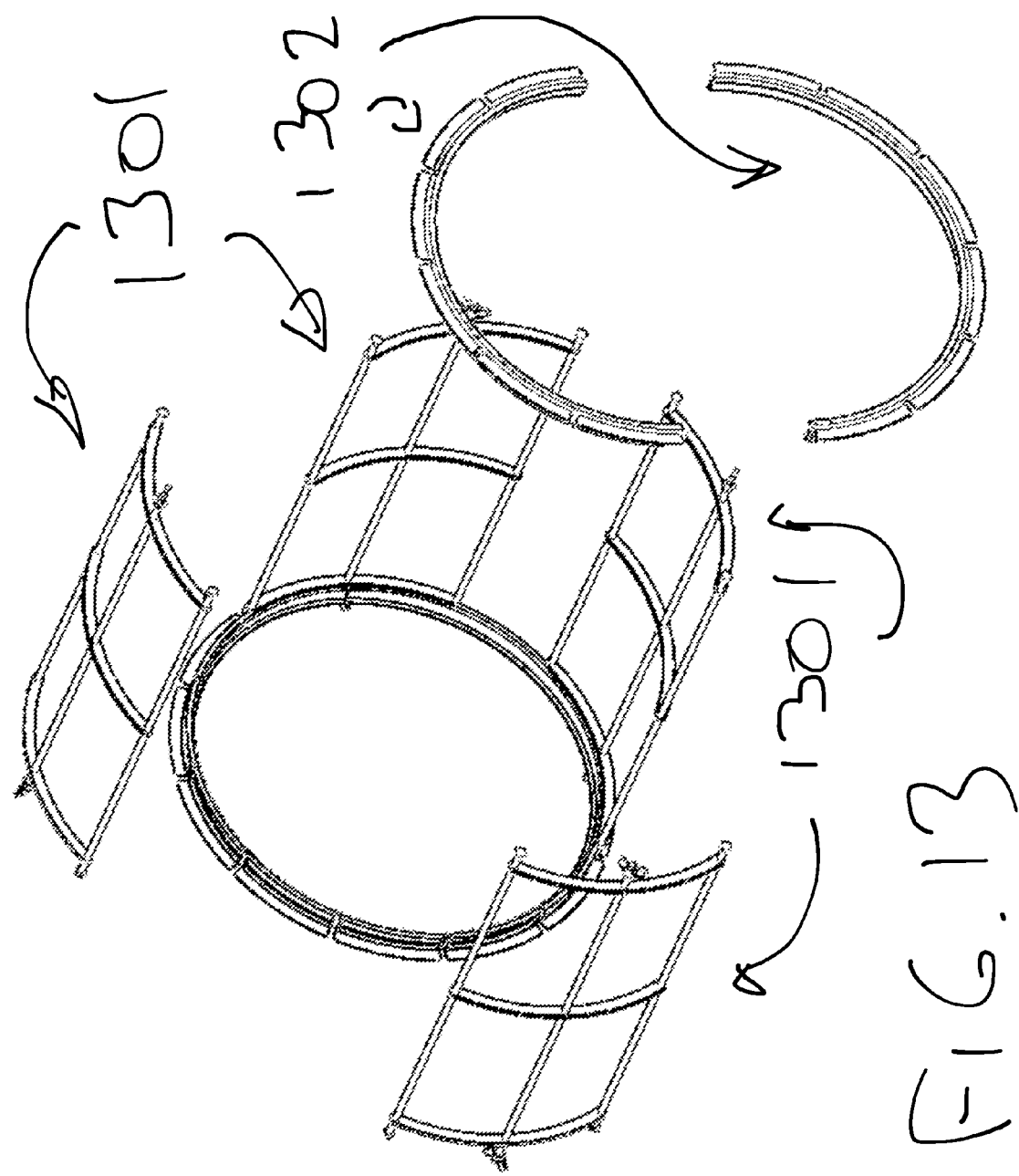
FIG. 13 is an exploded view of the cage of FIG. 12.

FIGS. 12 and 13 show the construction of the cage, 801. In FIG. 12, the assembled cage, 801, is shown, comprised of tracks, 203, having slots, 1201, into which are received transverse bars, 1202. Transverse bars, 1202, are first assembled into groups held together by circumferential bars, 1203, and are held in the slots, 1201, of the tracks, 203, by threaded ends and wing nuts, 1204. Assembling the cage, 801, of discrete groups of components, as shown in FIG. 13, permits the components to be partially assembled, inserted into the center of the wheel, and then assembly completed, yielding the form shown in FIG. 12. The assembly process is described in greater detail, below. As shown in FIG. 13, groups of three transverse bars, 1202, and three circumferential bars, 1203, can be pre-assembled into cage wall sections, 1301. The bars may be welded, fastened by threaded parts, or held together by any other suitable means. Further, FIG. 13 shows that the tracks, 203, each comprise two track halves, 1302. The track halves are held in their completed configuration in the exemplary embodiment when the cage wall sections, 1301, spanning the gap between the track halves, 1302, are fastened to the track halves, 1302, by wing nuts, as previously described.

Figure 14:
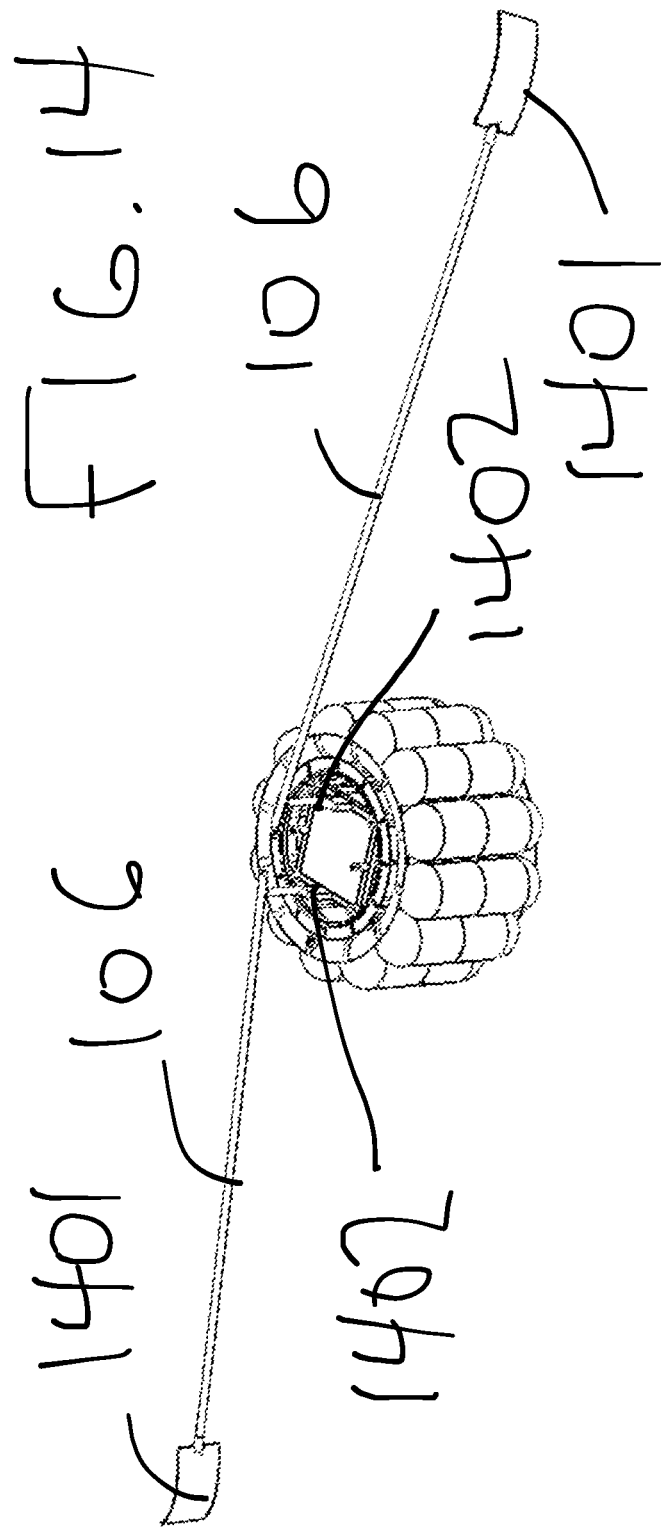
FIG. 14 is an isometric view of an embodiment of the invention in use as a boat with oars.

FIG. 14 shows an embodiment of the cart, for example of FIG. 1, in which the two handles, 106, have been detached from mounting brackets, 105, and have oar heads, 1401, attached to one end. The oar heads, 1401, can be pinned in place with clevis pins, similar to the way the handles were shown to connect to the mounting brackets, 105, or the oar heads, 1401, can include ball detents that mate with the clevis pin holes in the handles, 106. The oars (assembled of handles and oar heads) attach to oar locks, 1402, that fit into any suitably located pair of mounts, 1101.

In yet other alternatives, one or more handles, 106, can be mounted to mounts, 1101, with the wheel laid on a side with the opening of the container up. In that configuration, the handle(s), 106, can provide support for a tarpaulin, lines, or other items, such that a shelter, covered or uncovered operating room with supplies, covered or uncovered pantry, covered or uncovered remote equipment enclosure, or the like can be formed.

Figure 15:
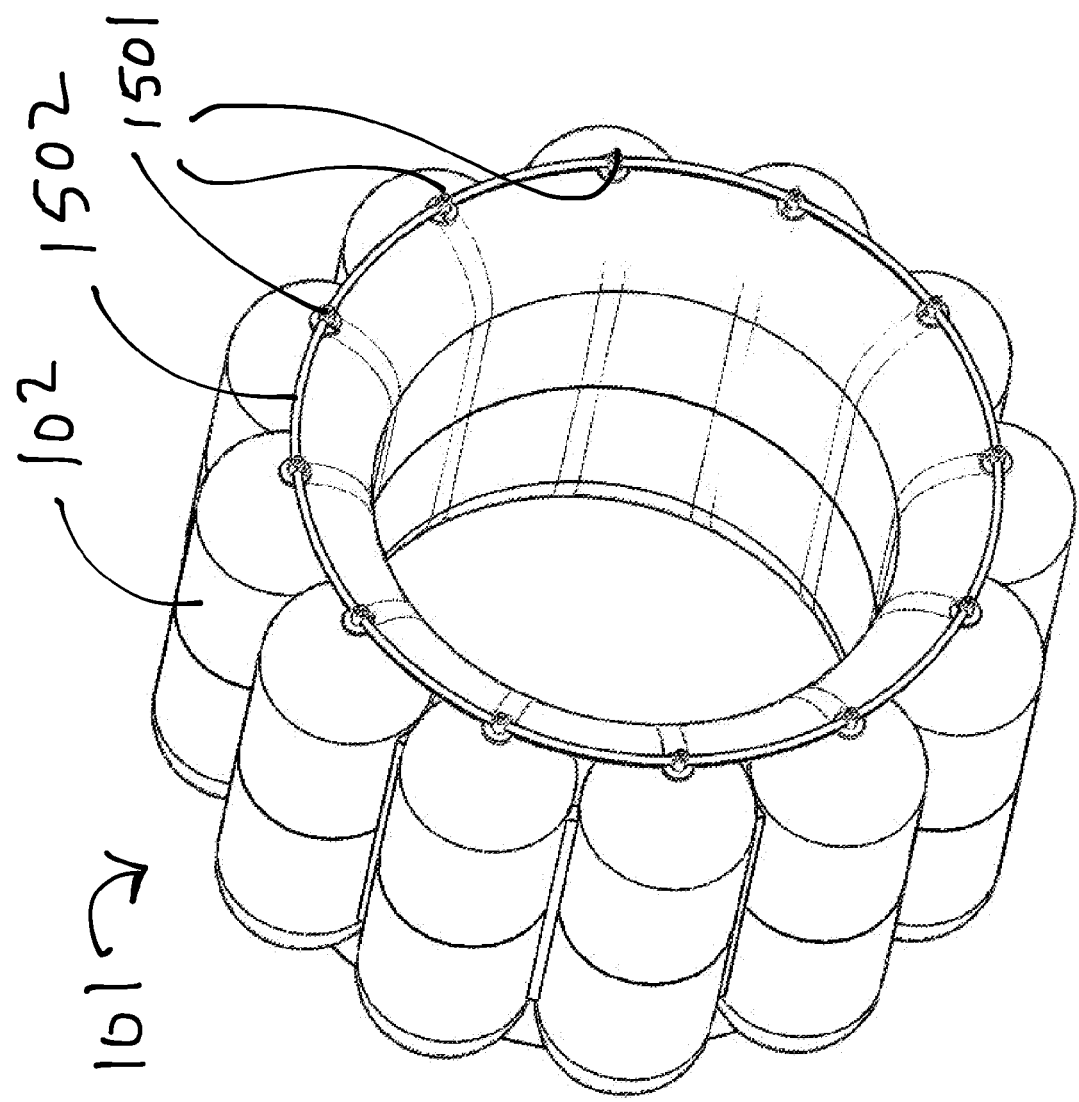
FIG. 15 is an isometric view of a wheel incorporating a manual valve arrangement for inflating inflatable wheel segments.

FIG. 15 shows the wheel, 101, having plural inflatable wheel segments, 102. The inflatable wheel segments, 102, are arranged transversely across the tread region defined by the circumference of the wheel, parallel to the axis of rotation of the wheel, i.e., axial to the wheel. Thus, as the wheel traverses a path along the ground, each inflatable wheel segment, 102, sequentially contacts the ground along the path as the wheel rolls. In this embodiment, each inflatable wheel segment, 102, has attached to one end thereof a valve, 1501. Each valve, 1501, is connected to adjacent valves, 1501, to each side thereof by a hose, 1502. The configuration and arrangement of the valves, 1501, together with the hoses, 1502, permits manual filling of any one or more inflatable wheel segments, 102, with an inflation fluid, such as air, another gas, or the like, as well as isolation of any inflatable wheel segment, 102, such as may be desired in the event of a puncture.

Figure 16:
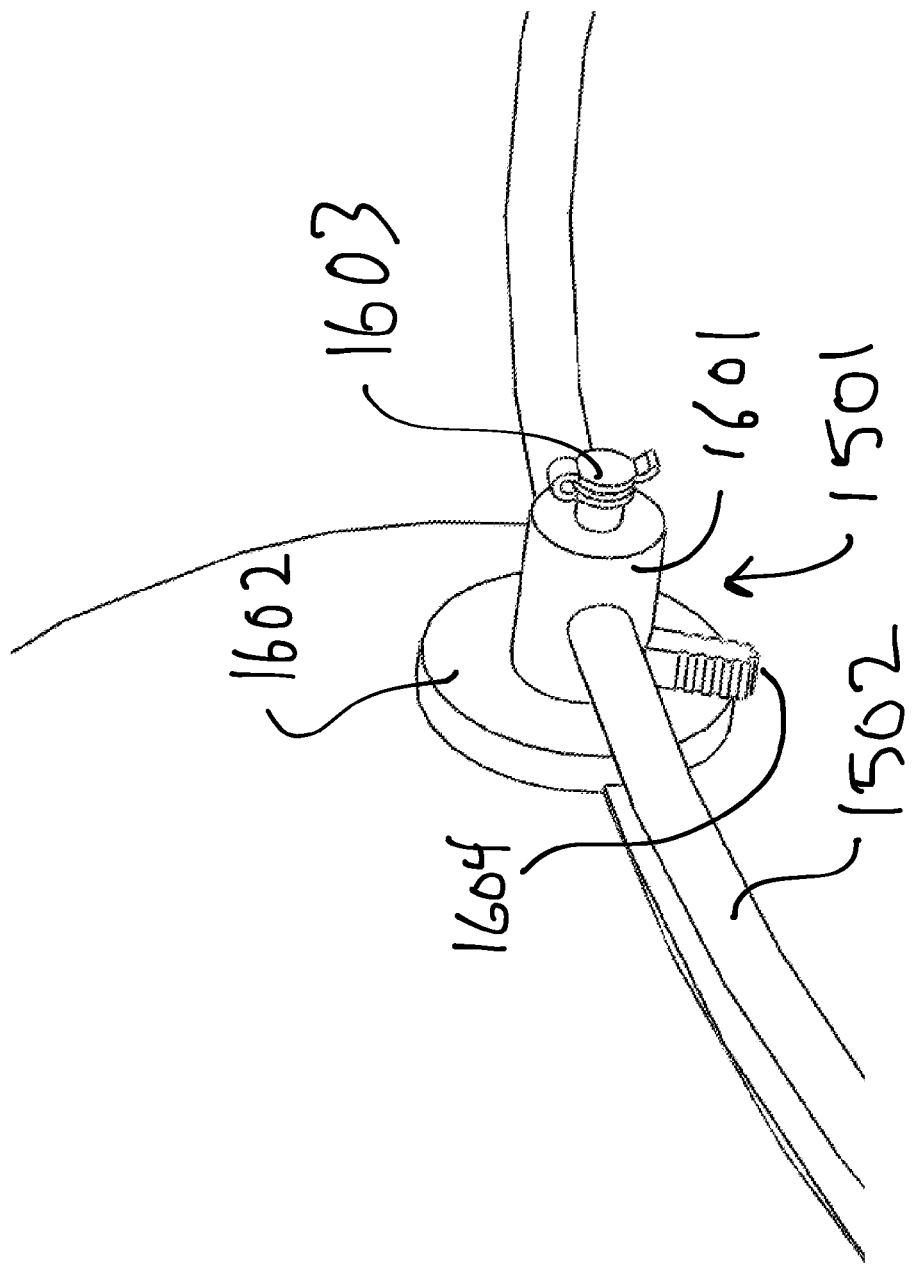
FIG. 16 is a detail view of a valve of the wheel of FIG. 15.

The detailed valve arrangement is next described in connection with FIG. 16. Each valve, 1501, has a valve body, 1601, having a flange, 1602, by which the valve is attached to the inflatable wheel segment, 102. The valve may be welded, glued, adhered, clamped, or otherwise fixed to the inflatable wheel segment, 102, using any suitable means known in the art. Each valve has a valve cap, 1603, that seals the valve closed when not in use for inflating or deflating one or more inflatable wheel segments, 102. In addition, each valve has a lever, 1604, by which a gate or switching valve can manually effect communication of inflation fluid from the valve cap, 1603, to the inflatable wheel segment, 102, or close off such communication. Hoses, 1502, attach to the valve body, 1601, at a point between the valve cap, 1603 and the gate or switching valve operated by lever, 1604, such that inflation fluid can be caused to communicate with the hoses, 1502, depending on the position of the lever, 1604. A switching valve with three positions, for example, could effect communication from the valve cap, 1603, to the hoses, 1502, only, in a first position; to the hoses, 1502, and the inflatable wheel segment, 102, in a second position; and, to the inflatable wheel segment, 102, only, in a third position.

Figure 17:
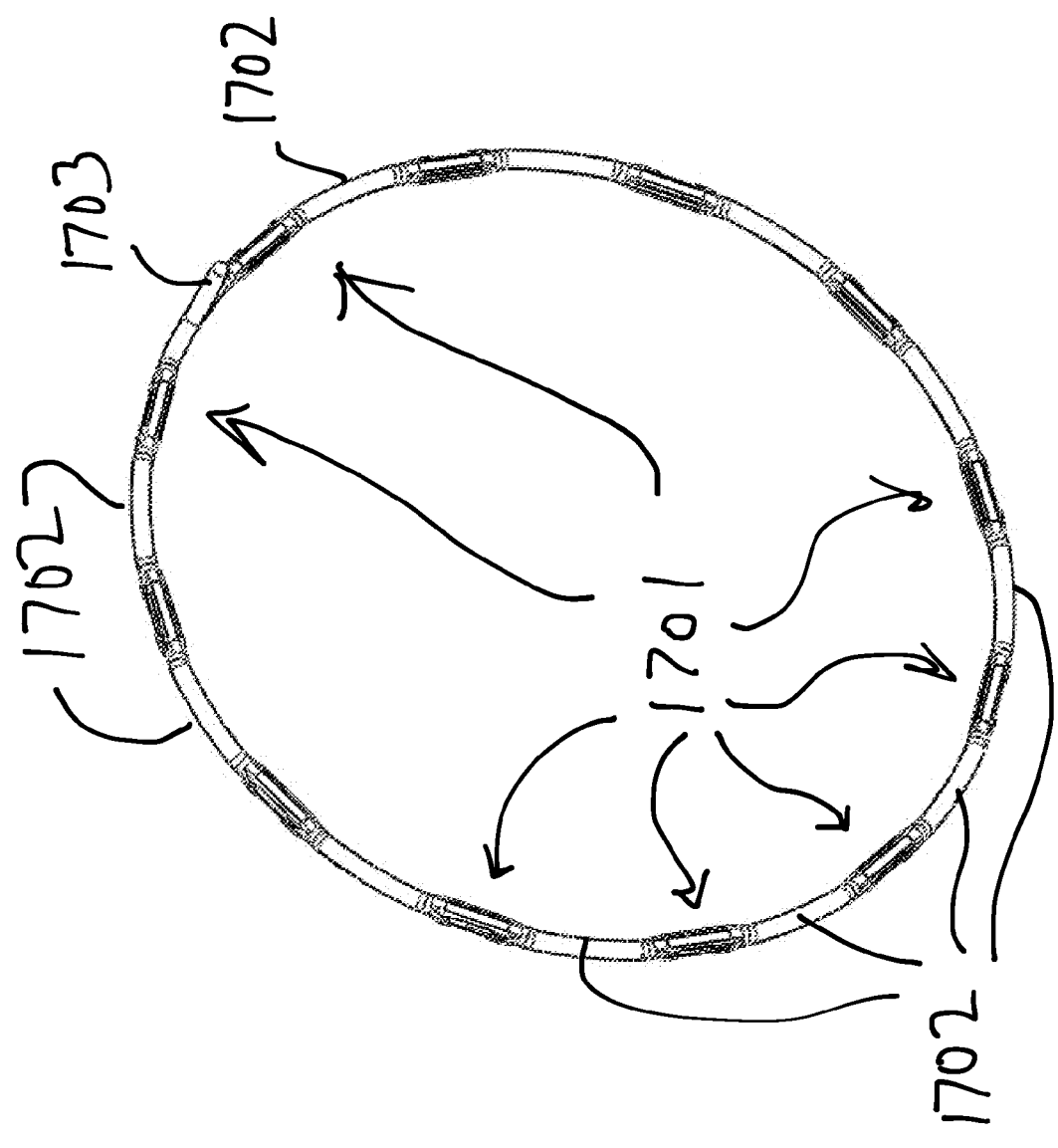
FIG. 17 is an isometric view of an alternative manifold and valve arrangement for inflating inflatable wheel segments.

FIG. 17 illustrates an alternative valve arrangement which permits the automatic inflation and deflation of the wheel, 101, using an arrangement of reed valves and hoses forming a manifold. A plurality of reed valves, 1701, equal in number to the number of inflatable wheel segments, 102, forming the wheel, 101, are interconnected by hoses, 1702. The reed valves have hollow bodies, such that this interconnected arrangement forms an inflation fluid manifold through which inflation fluid is distributed or exhausted. A port, 1703, is provided in one segment, instead of a hose, such that inflation fluid, for example air, or another suitable gas, can be introduced or exhausted from the manifold as desired by a bi-directional pump (not shown).

Figure 18:
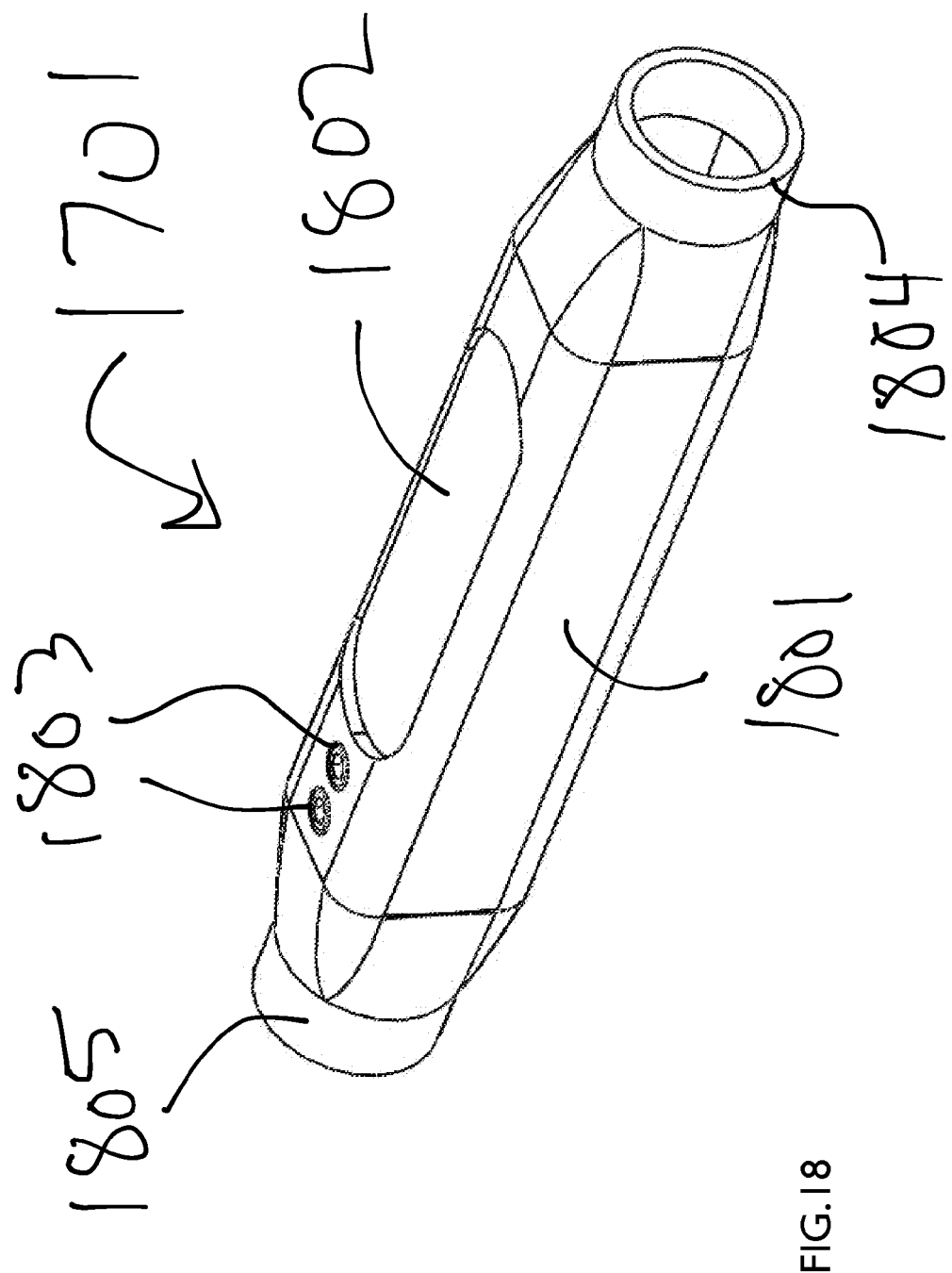
FIG. 18 is an isometric view of a reed valve in a closed position from the alternative arrangement of FIG. 17.

An exemplary reed valve, 1701, is now described in connection with FIG. 18. The valve, 1701, has a hollow valve body, 1801. A port is defined through one side of the valve body, 1801, which is covered by a reed, 1802, that slightly interferes with the opening defining the port. The reed, 1802, can, however, move through the port in either direction by application of sufficient pressure. The reed, 1802, is secured in place in the port by any suitable means, such as fasteners, 1803, welding, gluing, adhering, or the like. In order to connect into the manifold system as previously described, the valve body, 1801, includes connection ports, 1804 and 1805.

Figure 19:
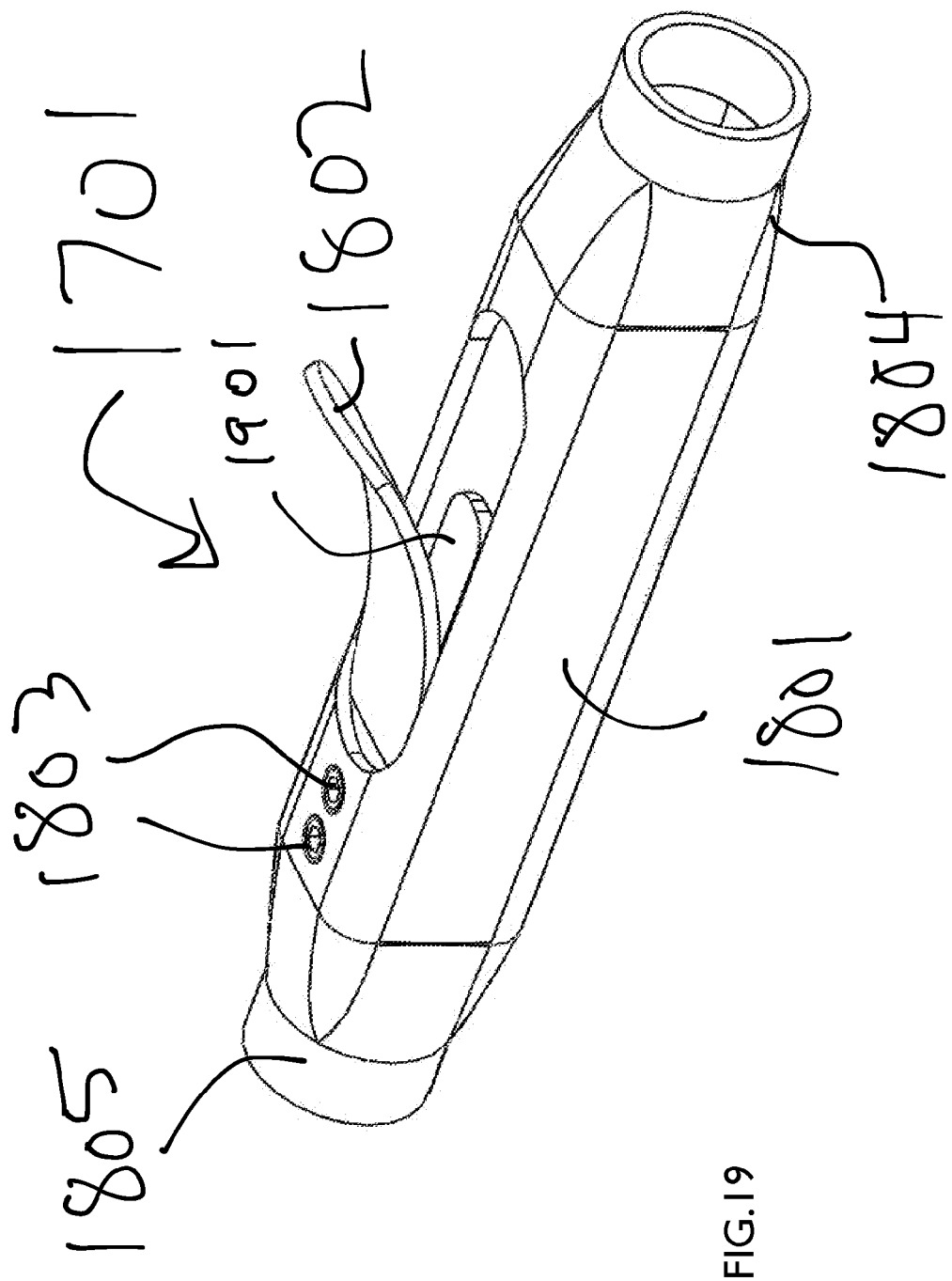
FIG. 19 is an isometric view of the reed valve in an open position from the alternative arrangement of FIG. 17.

FIG. 19 shows the valve under the condition that the pressure of the inflation fluid in the manifold (and so, in the valve body, 1801) is higher than the pressure in the inflatable wheel segment, 102, to which the valve is attached. Thus, the reed bends open in the outward direction. Within the valve body, 1801, can be now seen a spring, 1901, that causes a higher pressure in the inflatable wheel segment, 102, to be required to exhaust inflation fluid from the segment than the pressure required to fill the segment with inflation fluid from the manifold. By arranging the valve thus, it will be required to reverse operation of the bi-directional pump to exhaust inflation fluid from the inflatable wheel segments, and inflation fluid will not be pushed out by the expected periodic loading of the inflatable wheel segments during ordinary rolling operation of the wheel.

Figure 20:
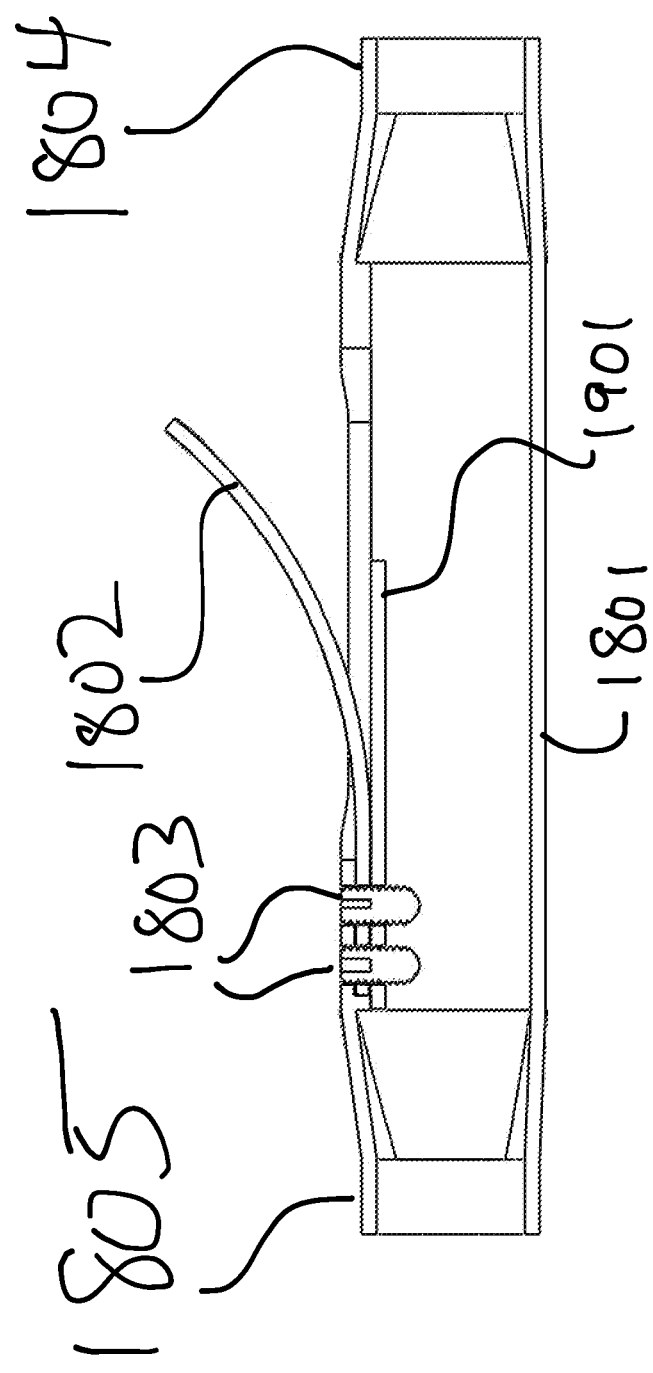
FIG. 20 is a cutaway side view of the reed valve of FIG. 19 in an open position.
Figure 21:
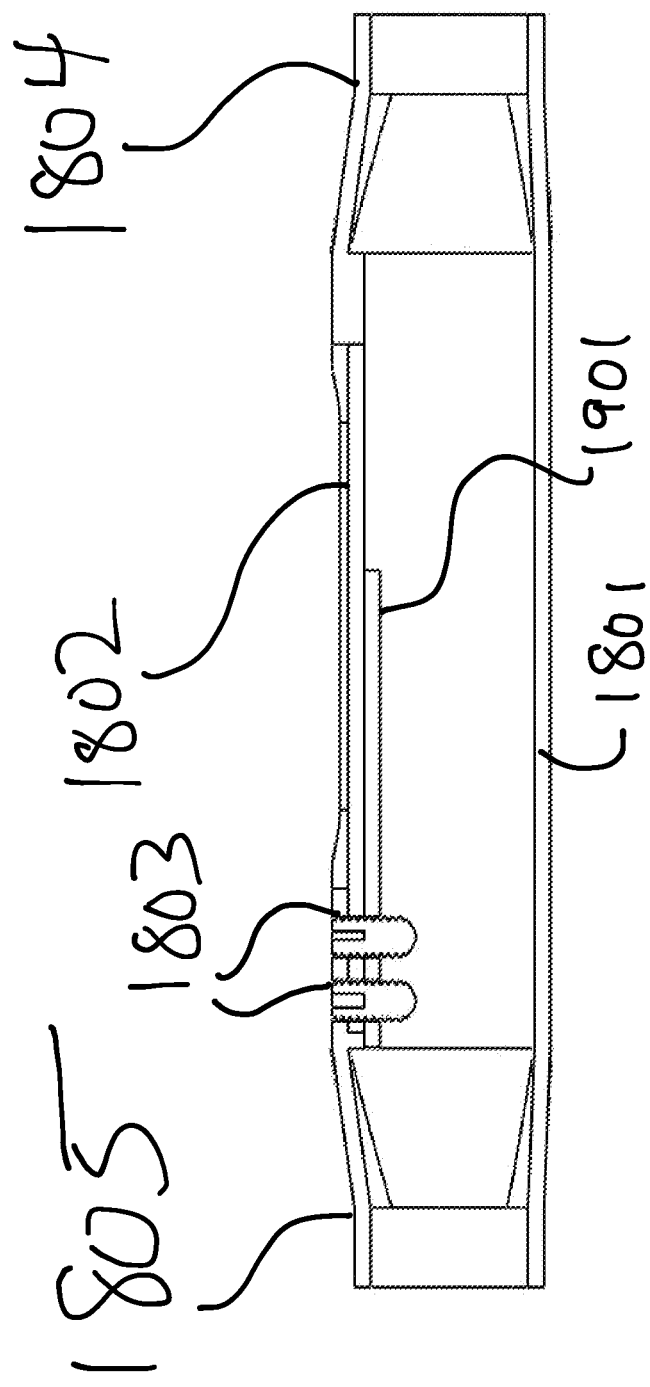
FIG. 21 is a cutaway side view of the reed valve of FIG. 18 in an closed position.

FIGS. 20 and 21 show the reed, 1802, in open and closed positions, respectively, as inflation fluid is introduced into the inflatable wheel segment or retained by the inflatable wheel segment. When it is desired to exhaust inflation fluid from the segment, the bidirectional pump operation is reversed and each segment is loaded with the mass of the cart and its load, by rotation into contact with the ground, such that the manifold pressure is then below that of the inflatable wheel segment when loaded, by a sufficient amount to permit the reed, 1802, to bend back against spring, 1902, and inflation fluid to thus be exhausted.

Figure 22:
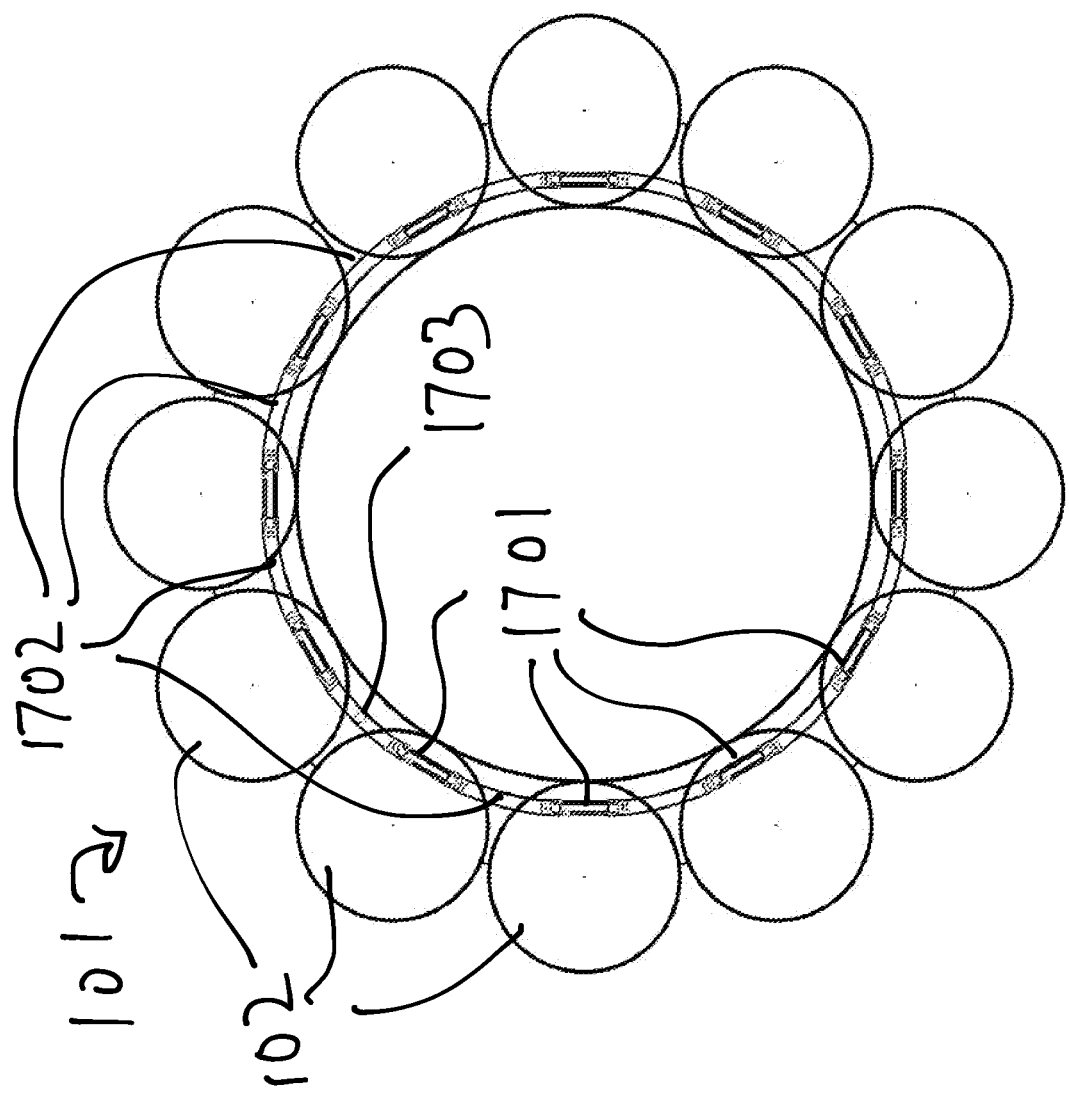
FIG. 22 is a side cutaway view of the valve and manifold arrangement of FIG. 17 assembled to an inflatable wheel having plural inflatable wheel segments.

FIG. 22 shows the arrangement of the manifold against the wheel, 101. Each reed valve, 1701, is bonded, welded, affixed, clamped, or otherwise attached and sealed to a corresponding inflatable wheel segment, 102.

The cart of the present invention is advantageously configured and arranged to be provided in both assembled and kit form, as now described in connection with FIGS. 23-35. Aspects and variations on aspects of the illustrative embodiments presented may particularly lend themselves to the kit embodiment now described, and other embodiments having features that lend themselves to this and other kit embodiments will also be apparent as the description of kit embodiments is read.

Figure 23:
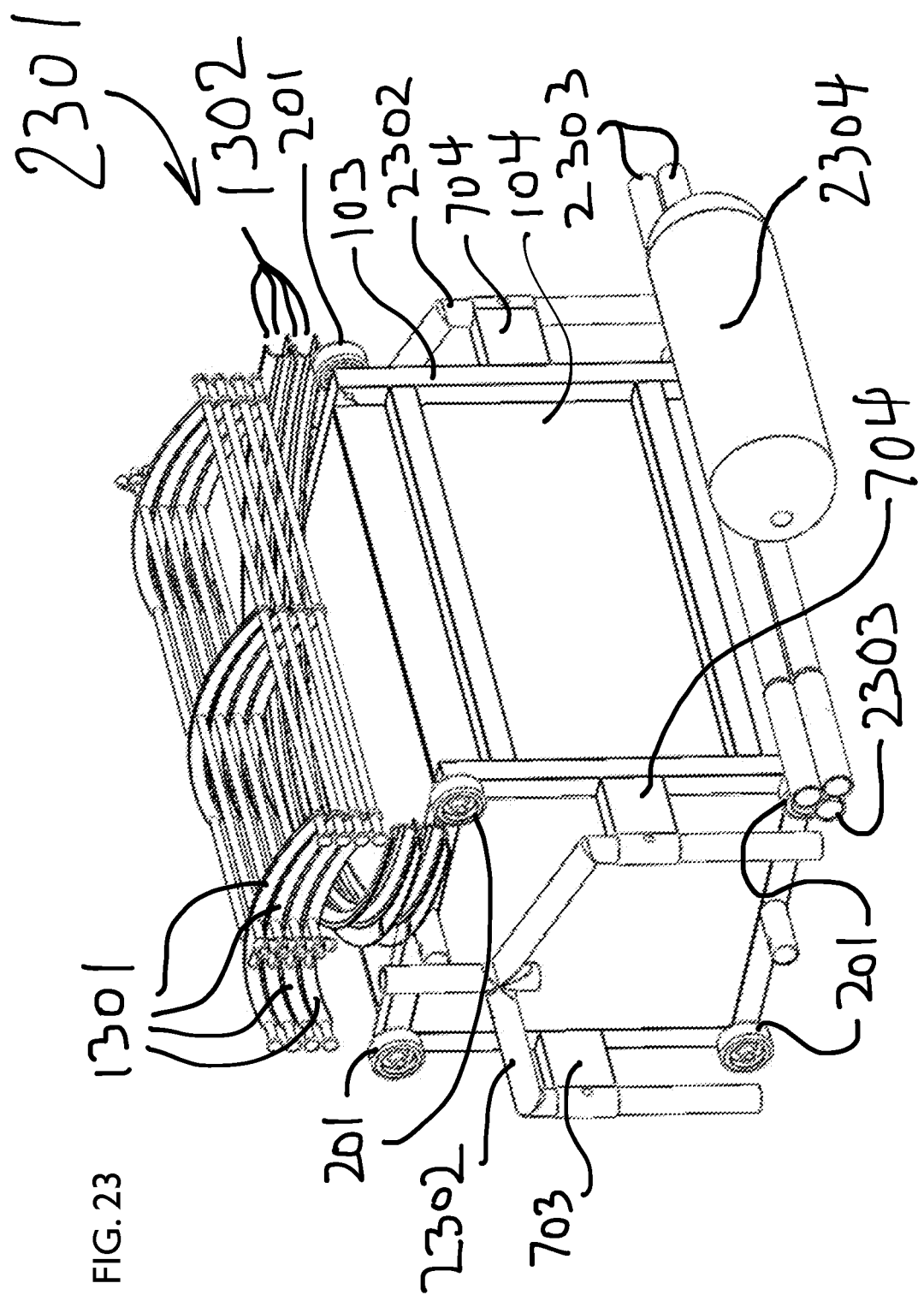
FIG. 23 is an isometric view of the cart as a disassembled kit.

As shown in FIG. 23, the cart of the embodiment of FIG. 1, for example, can be disassembled into a kit, 2301, of compactly stored components. In the stowed, or kit, configuration, 2301, each of the elements previously described can be seen as separate components of the kit, 2301.

Beginning with the top of the stack of components, elements of the cage, 801, are seen. Four pre-assembled cage walls, 1301, are stacked on top of four track halves, 1302.

Figure 34:
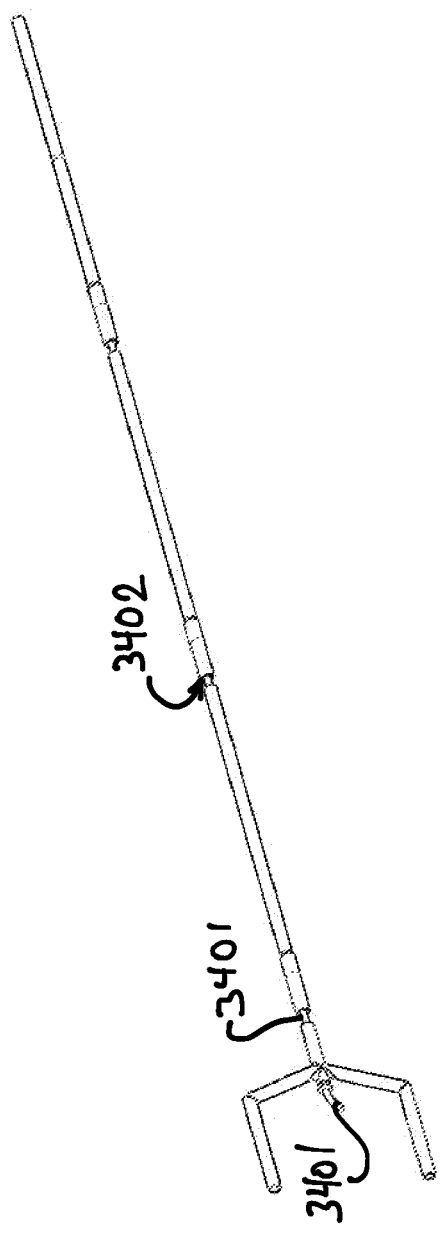
FIG. 34 is an isometric view of a handle assembly held together with shock cord.

The cage walls, 1301, and track halves, 1302, rest atop frame, 103, which, in this kit includes an integral container, 104. Two handles (FIG. 1, 106) having bifurcated ends (FIG. 7, 701) have each been disassembled into a handle fork, 2302, and a bundle (one of two shown) of three handle rods, 2303. Each handle fork, 2302, and each of the handle rods, 2303, can have a threaded end, and thus screw together, or they can have slip joints at the ends which are then pinned together with cotter pins through suitably located holes (not shown). Each bundle of three rods together with a corresponding handle fork can alternatively include a shock cord, 3401, running through an interior bore, 3402, of each rod, 2303, and the handle fork, 2302, as shown in FIG. 34, rendering the entire bundle self-assembling by simply aligning the rods and the handle fork and allowing the shock cord to pull the assembly together. In the illustrative embodiment, the handle forks, 2302, are partially pre-assembled to the cart, by simply being unpinned in their sockets, 703 and 704, and slid to a more convenient storage position, while the handle rods, 2303, are simply and conveniently stacked together.

Placed, in the view of FIG. 23, at the front of the stacked kit, is a sack containing the now-deflated inflatable tread element or elements, 2304, which are rolled and stored in the bag similarly to the storage of a sleeping bag in its stuff bag.

Variations on the disassembly of the cart into kit form are possible. For example, the cage, 801, can be broken down into more or fewer elements. The loose elements of the kit, such as cage walls, 1301, track halves, 1302, handle rods, 2303, can be defined, or by design changes that would be evident to skilled artisans can be further disassembled, to be small enough to fit within the container 104. The illustrative embodiment has the advantage that the number of components and sizes of the components leads to easy handling and quick assembly and disassembly with low risk of misplaced or lost components.

Figure 24:
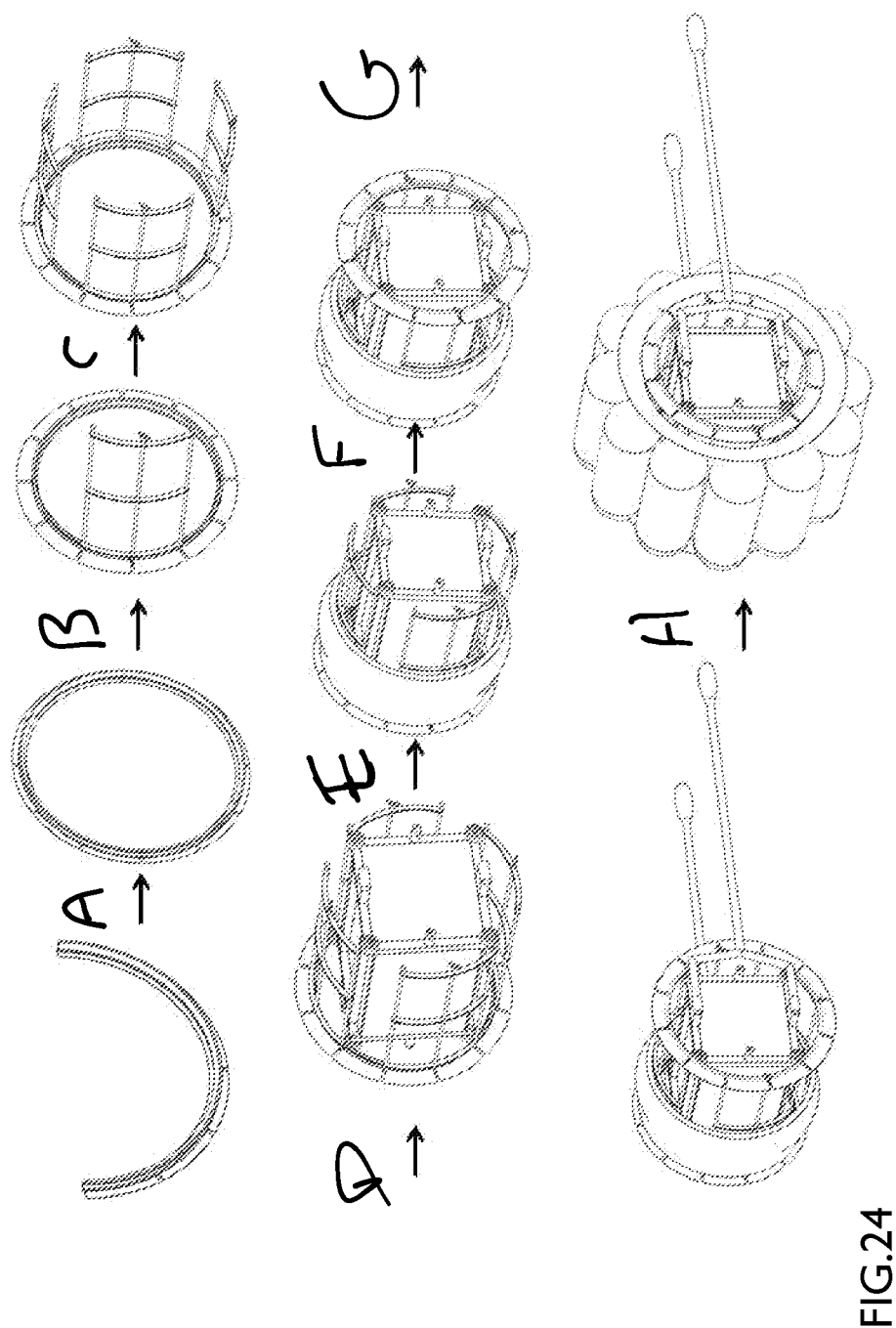
FIG. 24 is a sequential illustration of the assembly steps for transforming the kit of FIG. 23 to a cart of the exemplary embodiment of FIG. 1.
Figure 25:
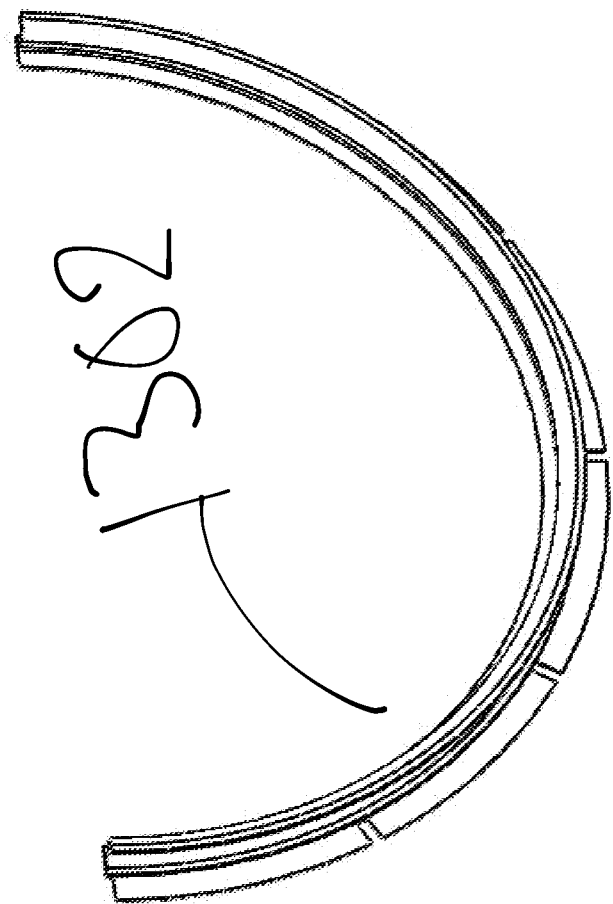
FIG. 25 is an isometric view of the assembly of FIG. 24, prior to Step A.
Figure 26:
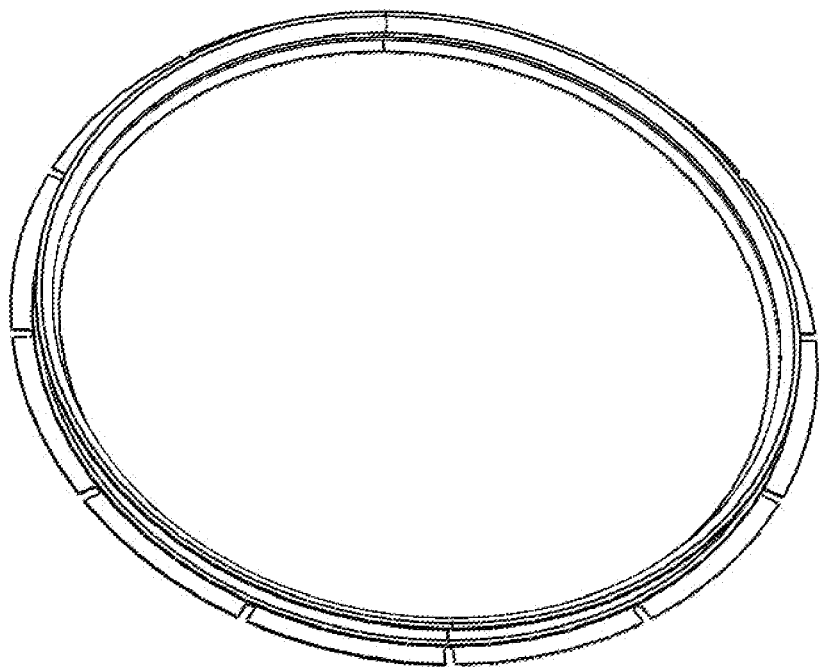
FIG. 26 is an isometric view of the assembly of FIG. 24, after Step A.
Figure 27:
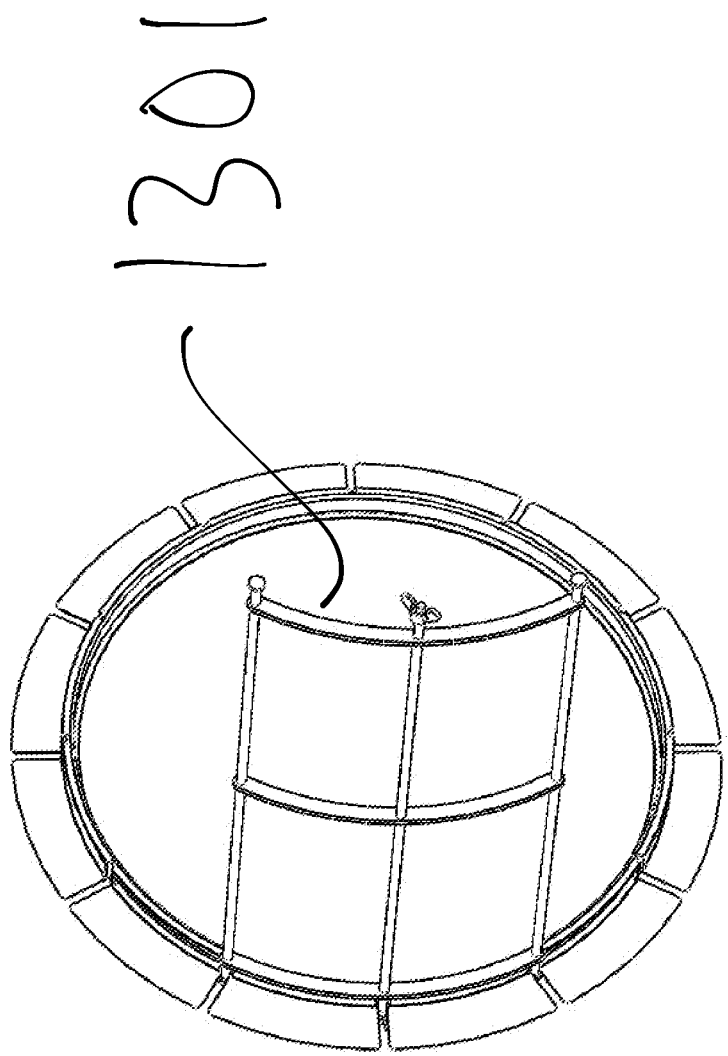
FIG. 27 is an isometric view of the assembly of FIG. 24, after Step B.
Figure 28:
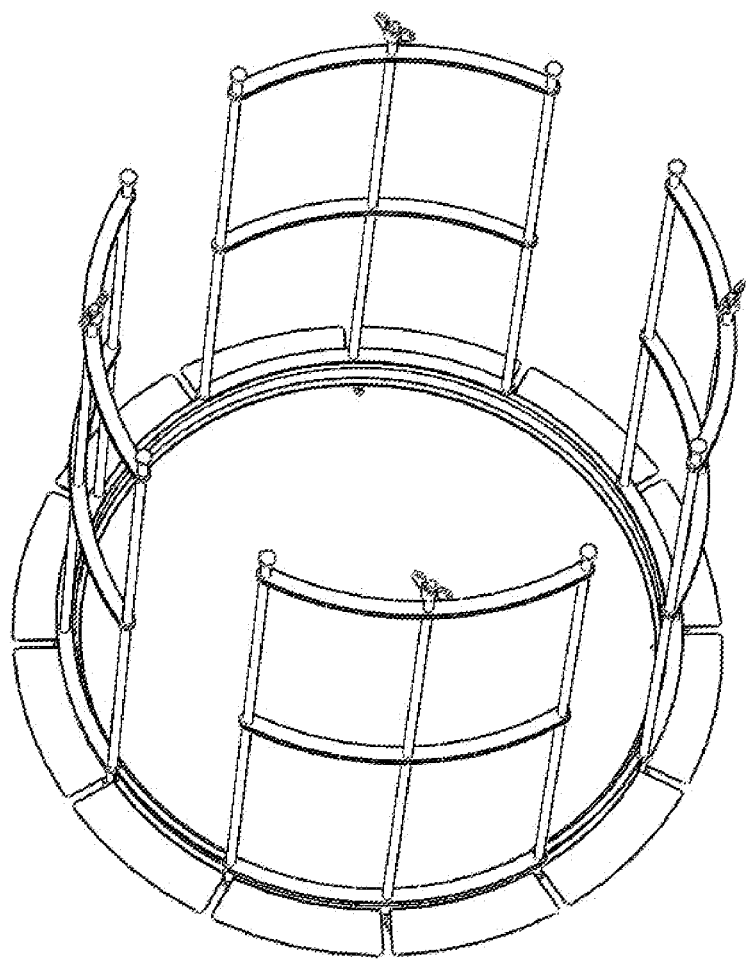
FIG. 28 is an isometric view of the assembly of FIG. 24, after Step C.
Figure 29:
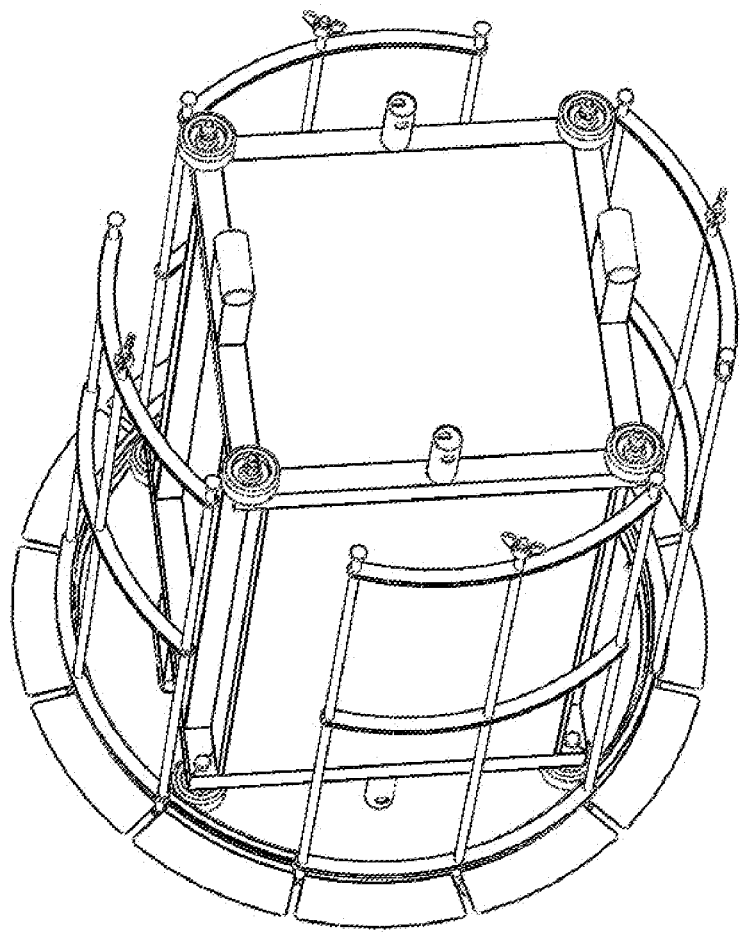
FIG. 29 is an isometric view of the assembly of FIG. 24, after Step D.
Figure 30:
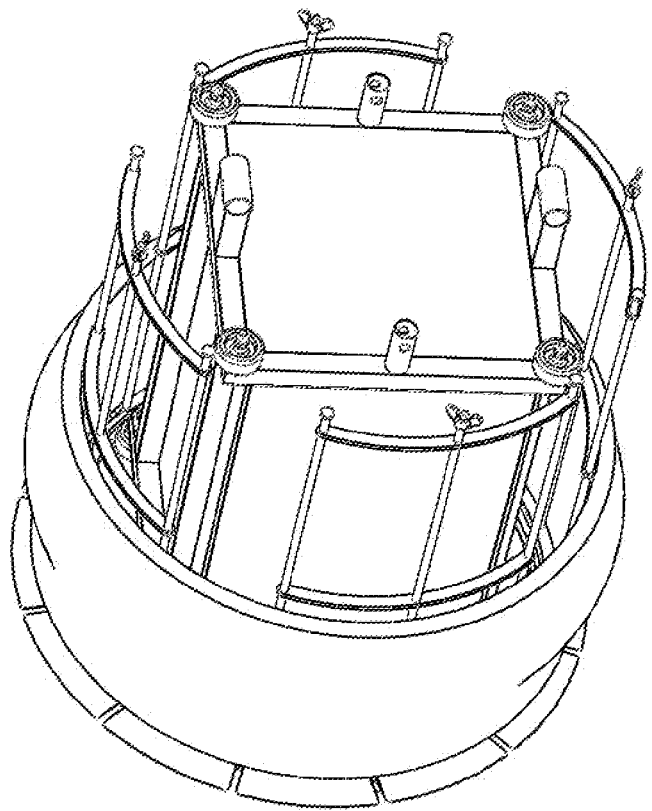
FIG. 30 is an isometric view of the assembly of FIG. 24, after Step E.
Figure 31:
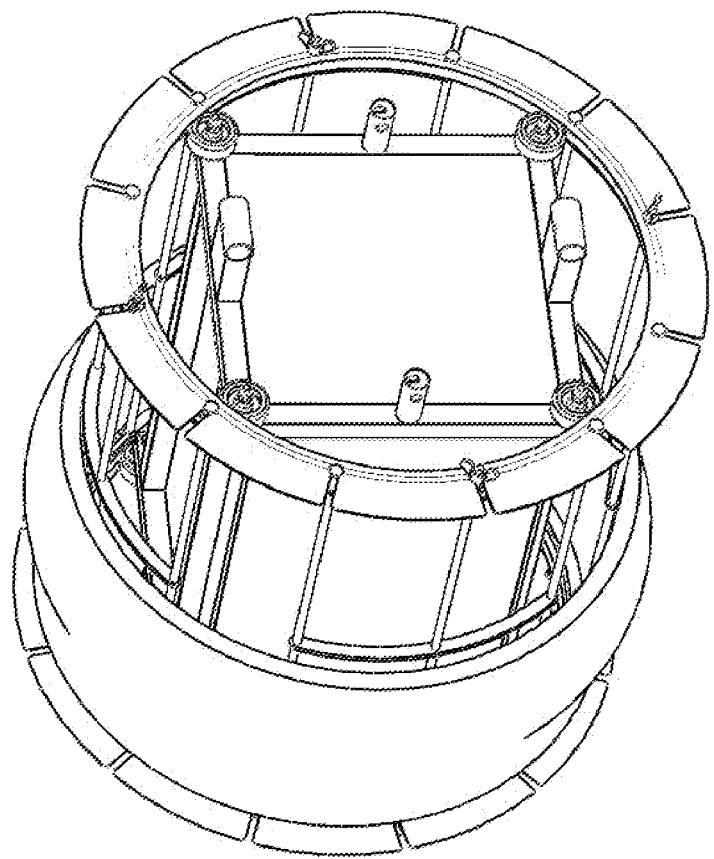
FIG. 31 is an isometric view of the assembly of FIG. 24, after Step F.
Figure 32:
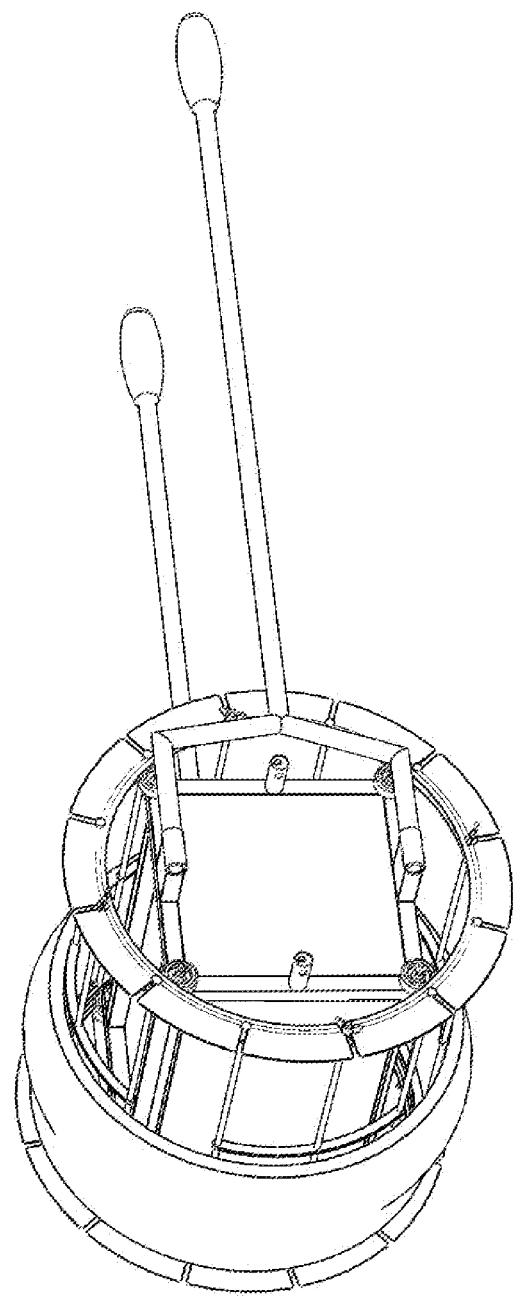
FIG. 32 is an isometric view of the assembly of FIG. 24, after Step G.
Figure 33:
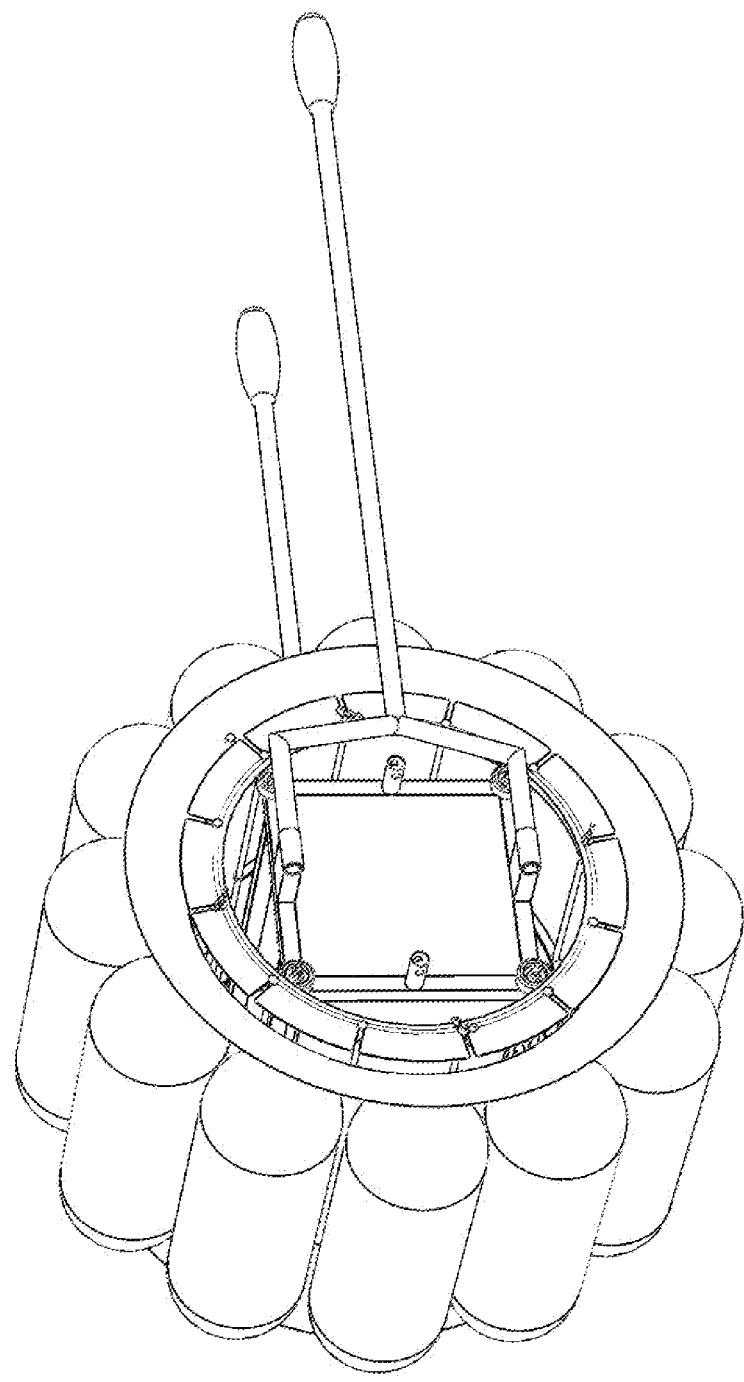
FIG. 33 is an isometric view of the assembly of FIG. 24, after Step H.

The kit of FIG. 23 is assembled into a complete cart, as shown in FIG. 24. A first set of track halves (FIG. 23, 1302) are arranged, step A, to form a track configuration. The track configuration receives, step B, a first cage wall (FIG. 23, 1301) which holds the track together for subsequent steps by bridging the two track halves. Three more cage walls are added, step C. The frame (FIG. 23, 103), which in this embodiment includes the integral container (FIG. 23, 104), is slid into the partially assembled cage so that wheels (FIG. 23, 201) in the corners of the frame engage the track that is now fully assembled, step D. The inflatable tread element or elements (FIG. 1, 102) for the wheel is slid onto the cage from the unassembled end, step E, after which the remaining two track halves (FIG. 23, 1302) can be received onto the cage walls (FIG. 23, 1301), step F. The transverse rods having threaded ends fitting into slots in the tracks hold the cage elements and the tracks together, as previously described. The handles are screwed together, pinned, or otherwise secured, as previously described, and fixed to the frame, for example by sliding to a working position in sockets, 703 and 704, and pinning, also as previously described, step G. Finally, the wheel is inflated, step H, producing the complete, working cart.

The state of the cart before step A, and after each of steps A through H, is illustrated in FIGS. 25-33, respectively.

The exemplary alternatives shown in the FIGS. can be recombined in various other permutations within the scope of this disclosure and the invention that will be evident to the skilled artisan only once given the suggestions shown.

For example, it should now be evident that various attachments, handle configurations, and transportable items render the cart useful for a variety of military, emergency services, search and rescue, and similar uses in the field. Uses by medics to bring medicines and equipment directly to a patient and also for patient transport should be evident. Other potential users include but are not limited to all potential disaster relief and rescue groups such as police/fire, EMS, tactical/technical rescues, and ski patrol. The specialized equipment employed by each of those groups can be adapted to the inventive concept. For example, fire jumpers can cart in various types of equipment for firefighting, and the tent configuration can, for example, be equipped with a fire-shelter fabric. Examples of consumer uses of the cart include but are not limited to carts for beachgoers, campers, gardeners, and household uses. In such products, the handles can support a flexible sheet or fabric usable to carry additional items and small children. The cart itself can house a complete tent and survival kit including food, shelter, cooking, and medical supplies, which can be brought into and out of rough or uneven terrain.

What is claimed is:

1. A rolling cart comprising:
a frame unit defining an interior space in which items are transportable;
a wheel, the wheel having a boundary defined by a circumference, a left edge maximum extent, and a right edge maximum extent;
a handle removably supported from the frame, the cart moved and controlled by the handle;
the interior space at least partly within the boundary;
a pole mount which can support the handle from the frame unit in a position substantially perpendicular to a plane in which the circumference lies; and
a shade fabric extensible from the handle; whereby
the handle, when supported by the pole mount, can support the shade fabric above a ground surface, and the shade fabric provides a sheltered area beneath the wheel when extended.

2. A rolling cart comprising:
a frame unit defining an interior space in which items are transportable;
a wheel, the wheel having a boundary defined by a circumference, a left edge maximum extent, and a right edge maximum extent;
a handle removably supported from the frame, the cart moved and controlled by the handle;
the interior space at least partly within the boundary;
an oarlock mount which can support the handle from the frame unit when the wheel lies in a position such that a plane in which the circumference lies is roughly parallel to a plane in which a water surface lies; and
a paddle end fitted to a distal end of the handle when the handle is supported by the oarlock mount; wherein
the cart possesses sufficient buoyancy to float along with the transportable items and a passenger.

3. The rolling cart of claim 2, wherein the wheel substantially provides the sufficient buoyancy.

4. The rolling cart of claim 1, further comprising a handle extension forward of the cart and a handle extension aft of the cart, whereby the cart can be maneuvered by two handlers, one fore and one aft.

5. The rolling cart of claim 2, further comprising a handle extension forward of the cart and a handle extension aft of the cart, whereby the cart can be maneuvered by two handlers, one fore and one aft.

6. The rolling cart of claim 1, wherein the handle further comprises:
a shoulder harness, whereby the cart can be hauled using shoulder contact to transfer force from a handler to the cart.

7. The rolling cart of claim 2, wherein the handle further comprises:
a shoulder harness, whereby the cart can be hauled using shoulder contact to transfer force from a handler to the cart.

8. The rolling cart of claim 1, further comprising:
a flexible sheet suspended from the handle and configured and arranged to carry a non-ambulatory person or object.

9. The rolling cart of claim 2, further comprising:
a flexible sheet suspended from the handle and configured and arranged to carry a non-ambulatory person or object.

10. A rolling cart comprising:
a frame unit defining an interior space in which items are transportable;
a wheel, the wheel having a boundary defined by a circumference, a left edge maximum extent, and a right edge maximum extent;
a handle removably supported from the frame, the cart moved and controlled by the handle; and
the interior space at least partly within the boundary; and
the wheel further comprising:
an inner surface rotatably supported from the frame unit; and
an inflatable segment connected to the inner surface and arranged within the circumference to support the cart; and
usable in conjunction with a pump, the inflatable segment comprising plural inflatable segments, and the wheel further comprising:
an inflation fluid manifold constructed and arranged to communicate with the pump for communicating inflation fluid with the inflation fluid manifold;
plural bi-directional valves corresponding to the plural inflatable segments communicating inflation fluid between the inflation fluid manifold and the plural inflatable segments; the plural bi-directional valves constructed and arranged to substantially freely admit the inflation fluid from the manifold into an inflatable segment at a manifold pressure higher than a segment pressure, and to exhaust inflation fluid from the inflatable segment into the manifold only at a segment pressure higher than a manifold pressure by at least an increment provided by a combination of a load of the cart and action of the bi-directional pump communicating inflation fluid out of the inflation fluid manifold; and wherein the plural bi-directional valves are reed valves further comprising:
a valve body having a passage defined through the valve body between the inflation fluid manifold and the inflatable segment, the passage having an edge;
a reed affixed to the edge of the passage, having one surface toward the inflation fluid manifold and another surface toward the inflatable segment, and bendable toward the inflation fluid manifold or the inflatable segment through the passage; and a spring disposed substantially adjacent to one surface of the reed such that a higher pressure is required to bend the reed toward the inflation fluid manifold than toward the inflatable segment.

11. The rolling cart of claim 10, further comprising a handle extension forward of the cart and a handle extension aft of the cart, whereby the cart can be maneuvered by two handlers, one fore and one aft.

12. The rolling cart of claim 10, wherein the handle further comprises:

a shoulder harness, whereby the cart can be hauled using shoulder contact to transfer force from a handler to the cart.

13. The rolling cart of claim 10, further comprising:

a flexible sheet suspended from the handle and configured and arranged to carry a non-ambulatory person or object.

* * * * *